United States Patent
Baba

(10) Patent No.: US 10,794,362 B2
(45) Date of Patent: Oct. 6, 2020

(54) METHOD AND SYSTEM FOR DIAGNOSING WIND TURBINE POWER GENERATING APPARATUS

(71) Applicant: MITSUBISHI HEAVY INDUSTRIES, LTD., Tokyo (JP)

(72) Inventor: Mitsuya Baba, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 218 days.

(21) Appl. No.: 15/936,488

(22) Filed: Mar. 27, 2018

(65) Prior Publication Data

US 2019/0063404 A1 Feb. 28, 2019

(30) Foreign Application Priority Data

Aug. 29, 2017 (JP) .................... 2017-164700

(51) Int. Cl.
    *F03D 7/02* (2006.01)
    *G03D 17/00* (2006.01)
    *F03D 17/00* (2016.01)

(52) U.S. Cl.
    CPC .......... *F03D 7/0224* (2013.01); *F03D 7/024* (2013.01); *F03D 17/00* (2016.05);
    (Continued)

(58) Field of Classification Search
    CPC ................. F03D 7/024; F03D 7/0224; F03D 7/02–0276; F03D 17/00; F05B 2260/80
    See application file for complete search history.

(56) References Cited

U.S. PATENT DOCUMENTS

| 4,181,017 A * | 1/1980 | Markle ................. F15B 19/005 137/489 |
| 6,705,683 B2 * | 3/2004 | Niepelt ................. B60T 8/4081 303/11 |

(Continued)

FOREIGN PATENT DOCUMENTS

| EP | 1760311 A2 | 3/2007 |
| EP | 2225460 B1 | 10/2011 |

(Continued)

OTHER PUBLICATIONS

Murello, R. 5 Ways to Tell if your Pump is Running Inefficiently Apr. 29, 2016 retrieved from https://empoweringpumps.com/5-ways-tell-pump-running-inefficiently/ (Year: 2016).*

(Continued)

*Primary Examiner* — Michael Lebentritt
*Assistant Examiner* — Topaz L. Elliott
(74) *Attorney, Agent, or Firm* — Hauptman Ham, LLP

(57) ABSTRACT

A method of diagnosing a wind turbine power generating apparatus includes: an operation step of operating a pitch actuator corresponding to one of a plurality of wind turbine blades of the wind turbine power generating apparatus, without operating a pitch actuator corresponding to each of the wind turbine blades other than the one of the plurality of wind turbine blades; and a measurement step of measuring a response value indicating a response to operation of the pitch actuator corresponding to the one of the plurality of wind turbine blades. The operation step and the measurement step are performed repeatedly for each of the plurality of wind turbine blades, and the response value is obtained as data for health check of a blade pitch mechanism of the wind turbine power generating apparatus.

12 Claims, 9 Drawing Sheets

(52) U.S. Cl.
CPC ..... *F05B 2260/406* (2013.01); *F05B 2260/79* (2013.01); *F05B 2260/80* (2013.01); *F05B 2270/1074* (2013.01)

(56) References Cited

U.S. PATENT DOCUMENTS

| | | | | |
|---|---|---|---|---|
| 7,322,794 B2* | 1/2008 | LeMieux | ................ | F03D 15/10 416/40 |
| 7,525,209 B2* | 4/2009 | Kabatzke | ............. | F03D 7/0224 290/44 |
| 7,860,663 B2* | 12/2010 | Miyasaka | ............. | G01H 1/003 702/35 |
| 7,954,372 B2* | 6/2011 | Brath | ................... | F03D 7/0204 290/44 |
| 7,982,327 B2* | 7/2011 | Arinaga | ................ | F03D 7/0224 290/44 |
| 8,070,439 B2* | 12/2011 | Melius | ................. | F03D 7/0224 416/61 |
| 8,324,749 B2* | 12/2012 | Minami | ................ | F03D 7/0224 290/44 |
| 8,360,722 B2* | 1/2013 | Hoffmann | ............. | F03D 7/0296 415/118 |
| 8,561,397 B2* | 10/2013 | Egedal | ................. | F15B 19/005 60/327 |
| 8,749,082 B2* | 6/2014 | Letas | ................... | F03D 7/0224 290/44 |
| 8,922,039 B2* | 12/2014 | Andersen | ............. | F03D 7/0224 290/44 |
| 9,533,667 B2* | 1/2017 | Cahill | ................... | B60T 17/221 |
| 2010/0135801 A1 | 6/2010 | Melius | | |
| 2011/0091321 A1* | 4/2011 | Baker | .................... | F03D 7/047 416/1 |
| 2011/0304140 A1 | 12/2011 | Minami et al. | | |
| 2012/0130678 A1 | 5/2012 | Ishioka et al. | | |
| 2012/0134828 A1* | 5/2012 | Andersen | ............. | F03D 7/0224 416/147 |
| 2013/0221676 A1* | 8/2013 | Caldwell | ................ | F04B 17/02 290/55 |
| 2013/0234433 A1* | 9/2013 | Tsutsumi | ................ | H02P 9/06 290/44 |
| 2013/0323051 A1* | 12/2013 | Yuge | ..................... | F03D 7/0224 416/1 |
| 2014/0054892 A1* | 2/2014 | Brown | ................. | F03D 7/0224 290/44 |
| 2014/0334927 A1* | 11/2014 | Hammerum | .......... | F03D 7/0224 416/1 |
| 2017/0260968 A1* | 9/2017 | Tsutsui | ..................... | F03D 7/02 |
| 2018/0135601 A1* | 5/2018 | Caponetti | .............. | F03D 17/00 |
| 2018/0291870 A1* | 10/2018 | Theopold | .............. | F03D 7/0224 |
| 2019/0048988 A1* | 2/2019 | Besser | ..................... | H02K 7/06 |
| 2019/0211805 A1* | 7/2019 | Elmose | .................. | F03D 7/0224 |

FOREIGN PATENT DOCUMENTS

| | | |
|---|---|---|
| EP | 3043066 B1 | 6/2017 |
| JP | 2006-105956 A | 4/2006 |
| JP | 1995134 B2 | 8/2012 |
| JP | 2012-197723 A | 10/2012 |
| JP | 2016-125947 A | 7/2016 |
| JP | 5981120 B2 | 8/2016 |
| WO | 2011/024304 A1 | 3/2011 |
| WO | 2011/101995 A1 | 8/2011 |
| WO | 2014/118907 A1 | 8/2014 |
| WO | 2016/042652 A1 | 3/2016 |
| WO | 2016/042983 A1 | 3/2016 |
| WO | 2016/147800 A1 | 9/2016 |
| WO | 2016/157503 A1 | 10/2016 |
| WO | 2017/013999 A1 | 1/2017 |

OTHER PUBLICATIONS

Office Action for Japanese Application No. 2017-164700 dated Aug. 3, 2018; 4 pp.
Extended European Search Report for European Application No. 18 16 4196 dated Oct. 29, 2018; 7pp.

* cited by examiner

METHOD AND SYSTEM FOR DIAGNOSING WIND TURBINE POWER GENERATING APPARATUS

RELATED APPLICATIONS

The present application claims priority to Japanese Application Number 2017-164700, filed Aug. 29, 2017, the disclosure of which is hereby incorporated by reference herein in its entirety.

TECHNICAL FIELD

The present disclosure relates to a method and a system for diagnosing a wind turbine power generating apparatus.

BACKGROUND ART

A wind turbine power generating apparatus includes a blade pitch mechanism for adjusting the pitch angle of a wind turbine blade. If the blade pitch mechanism fails to function normally, an unexpected excess load may be applied to the wind turbine blade, causing damage to the wind turbine blade. To reduce such a risk, diagnosis is performed to confirm whether the blade pitch mechanism functions normally.

As a method of diagnosing the blade pitch mechanism, for instance, Patent Document 1 discloses determining normality of an accumulator for accumulating pressurized oil to be supplied to a hydraulic cylinder constituting a blade pitch mechanism. More specifically, pressure of an oil passage in the vicinity of the accumulator is obtained by a hydraulic sensor, as an index of the gas pressure of the accumulator. Further, it is determined that an abnormality is occurring in the pressure accumulating function of the accumulator, if a detection value of the above described hydraulic sensor is not greater than a predetermined value: after elapse of a predetermined time after stopping a hydraulic pump for supplying pressurized oil to a hydraulic cylinder.

CITATION LIST

Patent Literature

Patent Document 1: WO2011/101995A

SUMMARY

Meanwhile, in a case where a wind turbine power generating apparatus includes a plurality of wind turbine blades, a blade pitch mechanism is normally provided for each of the wind turbine blades. Thus, for each of the plurality of wind turbine blades, it is required to diagnose the corresponding blade pitch mechanism appropriately.

However, D1 does not specifically disclose a method for appropriately diagnosing a blade pitch mechanism of each of a plurality of wind turbine blades constituting a wind turbine power generating apparatus.

In view of the above, an object of at least one embodiment of the present invention is to provide a method and a system of diagnosing a wind turbine power generating apparatus, whereby it is possible to diagnose blade pitch mechanisms of a wind turbine power generating apparatus including a plurality of wind turbine blades.

(1) A method of diagnosing a wind turbine power generating apparatus, according to at least one embodiment of the present invention, includes: an operation step of operating a pitch actuator corresponding to one of a plurality of wind turbine blades of the wind turbine power generating apparatus, without operating a pitch actuator corresponding to each of the wind turbine blades other than the one of the plurality of wind turbine blades; and a measurement step of measuring a response value indicating a response to operation of the pitch actuator corresponding to the one of the plurality of wind turbine blades. The operation step and the measurement step are performed repeatedly for each of the plurality of wind turbine blades, and the response value is obtained as data for health check of a blade pitch mechanism of the wind turbine power generating apparatus.

In the above method (1), data for health check of the blade pitch mechanism 20 is obtained for each of the wind turbine blades, in a state where the pitch actuators of the wind turbine blades other than the wind turbine blade (one of the wind turbine blades) for which data for heath check is to be obtained from among the plurality of wind turbine blades are not operated. Accordingly, it is possible to operate the pitch actuator of the wind turbine blade to be diagnosed in a state where influence of operation of the pitch actuators corresponding to the other wind turbine blades than the wind turbine blade to be diagnosed is reduced, and obtain a response value corresponding to the operation. Thus, according to the above method (1), it is possible to diagnose in detail the blade pitch mechanism of the wind turbine power generating apparatus including a plurality of wind turbine blades.

(2) In some embodiments, the above method (1) further includes obtaining the data for health check of the blade pitch mechanism including at least a first period of time required to change a pitch angle of each of the wind turbine blades to a first target value in a state where a driving current for driving the pitch actuator corresponding to each wind turbine blade is maintained to be constant.

When some abnormality is occurring in the blade pitch mechanism, a pitch rate in a case where a predetermined driving current is supplied to the pitch actuator may be different from that during normal operation of the blade pitch mechanism. In this case, the time required to change the pitch angle for a certain degree in a state where the driving current of the pitch actuator is maintained to be constant is different from that during normal operation of the blade pitch mechanism.

Thus, according to the above method (2), it is possible to appropriately diagnose the blade pitch mechanism on the basis of the first period of time by obtaining, as data for health check of the blade pitch mechanism, the first period of time required to change the pitch angle of the wind turbine blade to the first target value in a state where a driving current of the pitch actuator is kept constant for each of the wind turbine blades.

(3) In some embodiments, in the above method (1) or (2), the method further includes obtaining the data for health check of the blade pitch mechanism including at least a time integrated value of a driving current for driving the pitch actuator corresponding to each of the wind turbine blades in a case where the driving current is feedback-controlled so that a pitch angle of each wind turbine blade changes at a constant rate.

When some abnormality is occurring in the blade pitch mechanism, a driving current of the pitch actuator required to change the pitch angle at a constant pitch rate may be different from that during normal operation of the blade pitch mechanism.

Thus, according to the above method (3), by obtaining a time integrated value of a driving current of the pitch actuator in a case where a feedback control is performed on the driving current so that the pitch angle changes at a constant rate for each of the wind turbine blades, it is possible to appropriately diagnose the blade pitch mechanism on the basis of the time integrated value of the driving current.

(4) In some embodiments, in the above method (2) or (3), the driving current is a servo current to be supplied to a servo proportional valve for supplying pressurized oil to a hydraulic cylinder serving as the pitch actuator.

According to the above method (4), it is possible to perform appropriate diagnosis on the blade pitch mechanism for a wind turbine power generating apparatus using a hydraulic cylinder as a pitch actuator.

(5) In some embodiments, in any one of the above methods (1) to (4), the method includes: a step of, after operating the pitch actuator corresponding to one of a plurality of pitch accumulators corresponding to the plurality of wind turbine blades to a feather side with pressurized oil supplied from the one of the pitch accumulators, measuring a pressure of oil in a pitch oil line including the one of the pitch accumulators disposed therein and a gas pressure of the one of the pitch accumulators, during a period in which the pitch actuator is operated toward a fine side or the feather side only with the pressurized oil supplied from the one of the pitch accumulators; and a step of obtaining the gas pressure at a point of time when a difference between the gas pressure and a pressure of the oil reaches a set value or a later appropriate point of time when the difference is not smaller than the set value, as the data for health check of the blade pitch mechanism.

If the pitch accumulator is normal when pressurized oil accumulated in the pitch accumulator is discharged and there is no more pressurized oil that can be supplied to the pitch actuator from the pitch accumulator, the gas pressure of the pitch accumulator is art initially charged pressure. However, if an abnormality is occurring in the pitch accumulator, the gas pressure of the pitch accumulator may be different from the initially charged pressure.

With the above configuration (5), pressurized oil accumulated in the pitch accumulator corresponding to each wind turbine blade is discharged by operating the pitch actuator, for each wind turbine blade. Then, the gas pressure at the time when a difference between the gas pressure of the pitch accumulator and the pressure of the oil of the pitch oil line reaches a set value (i.e., when pressurized oil in the accumulator can be regarded as exhausted) is obtained as data for health check of the blade pitch mechanism. Thus, by using the gas pressure, it is possible to diagnose the pitch accumulator (blade pitch mechanism) appropriately.

(6) In some embodiments, the above method (5) further includes: a step of obtaining an index indicating a temperature of gas of the pitch accumulator at a point of time when a difference between the gas pressure and a pressure of the oil reaches a set value or a later appropriate point of time when the difference is not smaller than the set value; a step of obtaining the gas pressure at the point of time and an index indicating the temperature at the point of time, as data for health check of the pitch accumulator; and a step of diagnosing the one of the pitch accumulators on the basis of a correlation between the gas pressure at the point of time and the index indicating the temperature at the point of time.

The gas pressure of the pitch accumulator changes with temperature, even if conditions other than the temperature stay constant.

With the above configuration (6), the pitch accumulator is diagnosed on the basis of correlation between the gas pressure at the time when a difference between the gas pressure of the pitch accumulator and the pressure of the pitch oil line reaches a set value (i.e. when pressurized oil in the accumulator can be regarded as exhausted) and the index of the temperature of gas in the pitch accumulator at this time. Thus, it is possible to diagnose the pitch accumulator accurately.

(7) In some embodiments, any one of the above methods (1) to (6) further includes a step of obtaining, as data for health check of emergency operation of the blade pitch mechanism, a second period of time required to change a pitch angle of the wind turbine blade to a second target value by operating the pitch actuator to a feather side with pressurized oil supplied by opening operation of an emergency valve from the plurality of pitch accumulators provided corresponding to the plurality of wind turbine blades, respectively.

Normally, a wind turbine power generating apparatus is designed to, at the time of emergency, operate the emergency valve so that the pitch actuator is operated to the feather side with pressurized oil from the pitch accumulator, the pitch angle is changed to a predetermined angle within a predetermined time.

With the above configuration (7), it is possible to perform appropriate health check on emergency operation which indicates that operation of the emergency valve and other valves are normal, on the basis of the second period of time required to change the pitch angle to the second target value, by operating the emergency valve to operate the pitch actuator to the feather side.

(8) In some embodiments, any one of the above methods (1) to (7), further includes a step of obtaining, as data for health check of an accumulator solenoid valve, a third period of time required to change a pitch angle of the wind turbine blade to a third target value by operating the pitch actuator to a fine side or a feather side with pressurized oil supplied via the accumulator solenoid valve from the plurality of pitch accumulators provided corresponding to the plurality of wind turbine blades, respectively.

With the above configuration (8), it is possible to diagnose the accumulator solenoid valve appropriately on the basis of the third period of time required to change the pitch angle to the third target value by operating the pitch actuator with pressurized oil supplied via the accumulator solenoid valve from the pitch accumulator.

(9) In some embodiments, in any of the above methods (1) to (8), the wind turbine power generating apparatus includes: an oil supply line for supplying pressurized oil to a hydraulic cylinder serving as the pitch actuator; and a proportional valve disposed in the oil supply line, for adjusting the pressurized oil supplied to the hydraulic cylinder. The method includes a step of obtaining, as data for health check of the proportional valve, a pressure of the oil supply line at a start and an end of a predetermined period of time in a state where supply of the pressurized oil to the oil supply line and discharge of the pressurize oil from the oil supply line are stopped.

With the above configuration (9), by obtaining a pressure of the oil supply line at each of the start and the end of a predetermined period as data for health check, while supply of pressurized oil to the oil supply line and discharge of pressurized oil from the oil supply line are stopped, it is possible to calculate the reduction amount of the oil supply line pressure per unit time, that is, the leak amount of pressurized oil from the oil supply line via the proportional valve on the basis of the data for health check. Accordingly, it is possible to diagnose the proportional valve appropriately.

(10) In some embodiments, any one of the above methods (1) to (9) includes a step of obtaining, as data for health check of the pump, data related to active power or reactive power of a pump for producing pressurized oil to be supplied to the pitch actuator after elapse of a predetermined period of time after starting the pump or time from when the pump is started to when a line pressure of a discharge side of the pump reaches a predetermined value.

With the above configuration (10), data related to active power or reactive power of the pump at the time after elapse of a predetermined time after starting the pump for producing pressurized oil to be supplied to the pitch actuator (e.g. peak value or steady-state value), or time from start of the pump to time when pressure in the line on the discharge side of the pump reaches a predetermined value is obtained as data for health check of the pump. Thus, it is possible to diagnose the pump appropriately by using the data for health check.

(11) In some embodiments, in any one of the above methods (1) to (10), the data for health check of the blade pitch mechanism is obtained during shutdown or standby of the wind turbine power generating apparatus under a condition such that a wind velocity to the wind turbine power generating apparatus is not greater than a predetermined value and a main shaft rotation speed is not greater than a predetermined value, and the data for health check is compared to a predetermined normal management value or a predetermined normal management range corresponding to the data for health check, to determine whether the blade pitch mechanism is in need of checking.

With the above configuration (11), data for health check of the blade pitch mechanism is obtained during a shutdown or a standby of the wind turbine power generating apparatus, under a condition that the wind velocity and the main shaft rotation speed is not higher than a predetermined value. That is, the data for health check is obtained in a state where influence of wind load or the like applied to the wind turbine blades is reduced, and thereby it is possible to diagnose the wind turbine power generating apparatus accurately.

(12) A diagnosis system for a wind turbine power generating apparatus, according to at least one embodiment of the present invention, includes: a wind turbine controller configured to operate a pitch actuator corresponding to one of a plurality of wind turbine blades of the wind turbine power generating apparatus, without operating a pitch actuator corresponding to each of the wind turbine blades other than the one of the wind turbine blades; and at least one sensor for measuring a response value indicating a response to operation of the pitch actuator corresponding to the one of the plurality of wind turbine blade. The wind turbine controller is configured to perform operation of the pitch actuator and measurement by the sensor repeatedly for each of the plurality of wind turbine blades, and store the response value in a memory as data for health check of a blade pitch mechanism of the wind turbine power generating apparatus.

The wind turbine controller is capable of obtaining a measurement value from a sensor in every control calculation cycle of the wind turbine controller and holding the same. With the above described configuration (12), from data obtained in each control calculation cycle by the wind turbine controller, a response value suitable as data for health check is stored in the memory. The data for health check stored in the memory as described above is obtained from fine data per control calculation cycle, precisely representing the state of the wind turbine power generating apparatus. Thus, it is possible to perform appropriate diagnosis on the wind turbine power generating apparatus by using the data for health check stored in the memory.

(13) In some embodiments, in the above configuration (12), the diagnosis system further includes a data collection device for collecting the data for health check of the blade pitch mechanism from the memory of the wind turbine controller.

With the above configuration (13), the data collection part collects the data for health check from the memory, and thus it is possible to reduce communication load and easily perform subsequent data analysis, as compared to a case in which data is directly taken out from the wind turbine controller in each control calculation cycle.

(14) in some embodiments, in the above configuration (13), the diagnosis system further includes a diagnosis device configured to perform health check of the blade pitch mechanism on the basis of the data for health check collected by the data collection device.

With the above configuration (14), it is possible to perform health check of the blade pitch mechanism appropriately with the diagnosis device on the basis of data for health check collected by the above described data collection device.

(15) A diagnosis system for a wind turbine power generating apparatus according to at least one embodiment of the present invention is for performing the method according to any one of the above (1) to (11), and includes: a representative data memory part for storing representative data related to at least one parameter indicating a state of the wind turbine power generating apparatus; a representative data selection part configured to obtain data related to the at least one parameter once in every cycle not longer than 100 milliseconds, and determine whether to store the obtained data of the at least one parameter as the representative data of the parameter in the representative data memory part for every cycle; and a data collection part configured to collect the representative data of the at least one parameter related to the state of the wind turbine power generating apparatus stored in the representative data memory part from the representative data memory part. The representative data selection part is configured to select the data for health check as the representative data.

The above diagnosis system (15) is configured to obtain the data of the parameter indicating the state of the wind turbine power generating apparatus in a relatively short cycle of not longer than 100 ms, and determine whether to store the data as the representative data in the representative data selection part. Furthermore, the representative data memory part stores the data for health check described in the above (1) to (11), as the data determined as necessary to be stored as the representative data by the representative data selection part. The data for health check stored in the representative data memory part as described above is obtained from fine data per relatively-short cycle, and thus precisely represent the state of the wind turbine power generating apparatus. Therefore, by using the data for health check, it is possible to diagnose the wind turbine power generating apparatus appropriately.

Furthermore, the data collection part collects the representative data from the representative data memory part, and thus it is possible to reduce communication load and easily perform subsequent data analysis, as compared to a case in which data is directly taken out from the representative data memory part in a relatively short cycle.

Thus, with the above configuration (15), by using the representative data collected as described above, it is possible to diagnose the wind turbine power generating apparatus appropriately through facilitated data analysis.

According to at least one embodiment of the present invention, provided is a method and a system of diagnosing a wind turbine power generating apparatus, whereby it is possible to diagnose blade pitch mechanisms of a wind turbine power generating apparatus including a plurality of wind turbine blades.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
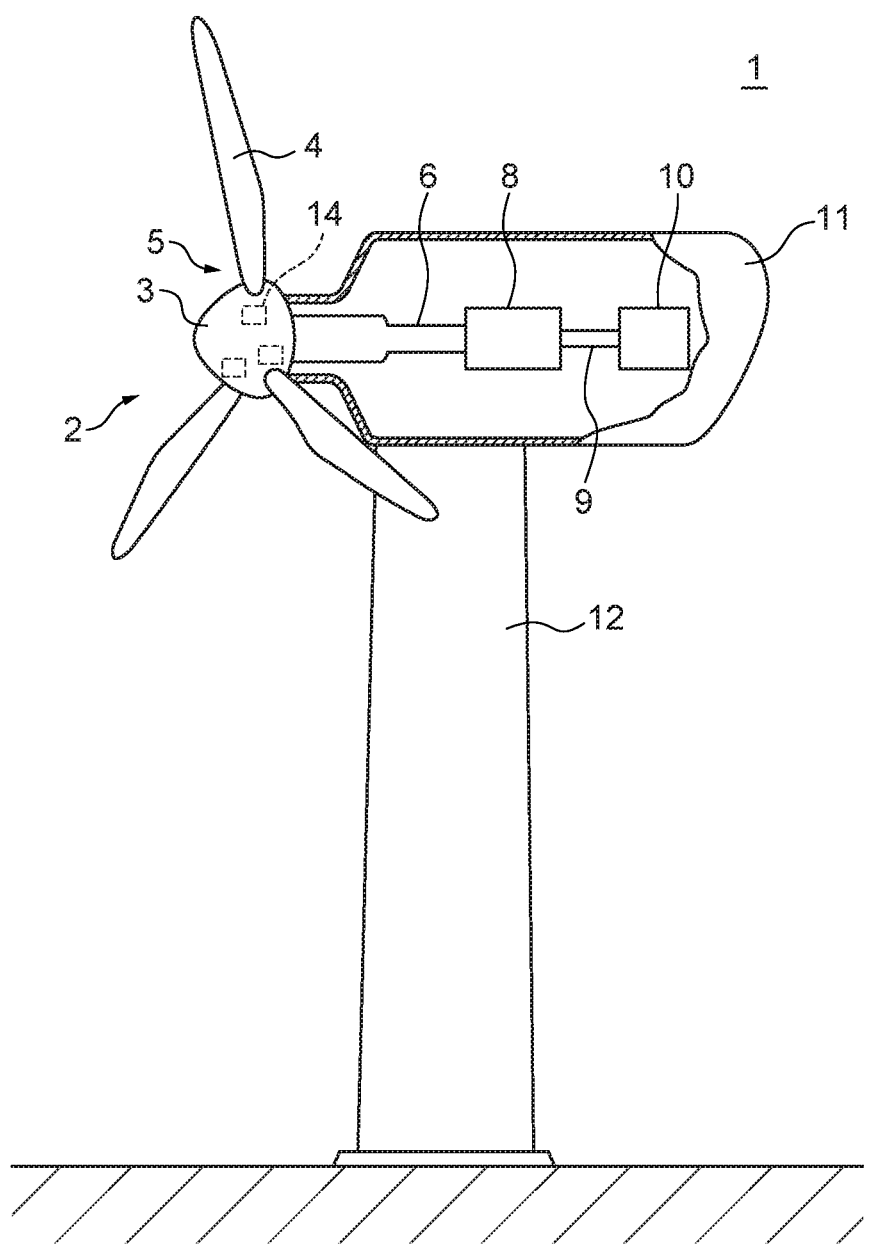
FIG. 1 is a schematic overall configuration diagram of a wind turbine power generating apparatus according to an embodiment.

First, a wind turbine power generating apparatus to be diagnosed by a diagnosis method according to an embodiment of the present invention will be described. FIG. 1 is a schematic overall configuration diagram of a wind turbine power generating apparatus according to an embodiment. As illustrated in the drawing, the wind turbine power generating apparatus 1 includes a wind turbine rotor 2 including a hub 3 with wind turbine blades 4 mounted thereto and a rotational shaft 6 coupled to the hub 3, a generator 10, and a drive train 8 for transmitting rotation energy of the wind turbine rotor 2 to the generator 10 via a rotation shaft 9. The generator 10 is configured to be driven by the rotational energy of the wind turbine rotor 2 transmitted by the drive train 8.

In this wind turbine power generating apparatus 1, the entire wind turbine rotor 2 rotates by the force of wind received by the wind turbine blades 4, and the rotation is inputted to the drivetrain 8 via the rotational shaft 6. The rotation inputted from the rotational shaft 6 is transmitted to the generator 10 by the drivetrain 8 via the rotation shaft 9. The drivetrain 8 may be a speed increasing unit configured to increase the speed of rotation inputted from the rotational shaft 6. The drivetrain 8 may be a hydraulic drivetrain including a hydraulic pump, a high-pressure oil line, a low-pressure oil line and a hydraulic motor, or a mechanical type (gear type) speed increasing unit.

Alternatively, the wind turbine power generating apparatus 1 may be a wind turbine power generating apparatus of direct-drive type in which the hub 3 and the generator 10 are directly coupled to each other and not via the drivetrain 8.

The drivetrain 8 and the generator 10 may be housed inside a nacelle 11 supported on a tower 12. The tower 12 may be disposed on a base on water or on land.

The wind turbine power generating apparatus 1 includes a blade pitch mechanism 20 (see FIG. 2) for adjusting the pitch angle of the wind turbine blade 4. The blade pitch mechanism 20 includes a pitch drive device 14 configured to change the pitch angle of the wind turbine blade 4. The pitch drive device 14 is provided for each of the plurality of wind turbine blades 4, and each pitch drive device 14 is configured to change the pitch angle of the wind turbine blade 4 corresponding to the pitch drive device 14. The blade pitch mechanism 20 may be configured to be controlled by the wind turbine controller 110 so as to change the pitch angle of the wind turbine blade 4 appropriately.

The pitch drive device 14 includes a pitch actuator connected to the wind turbine blade 4, and configured to operate so as to change the pitch angle of the wind turbine blade 4. The pitch actuator may be a hydraulic pitch actuator including a hydraulic cylinder, or an electric pitch actuator including an electric motor.

The wind turbine power generating apparatus 1 described below with reference to drawings includes a hydraulic pitch actuator including a hydraulic cylinder as the pitch drive device 14. Nevertheless, in some embodiments, the pitch drive device 14 may include an electric pitch actuator.

Figure 2:
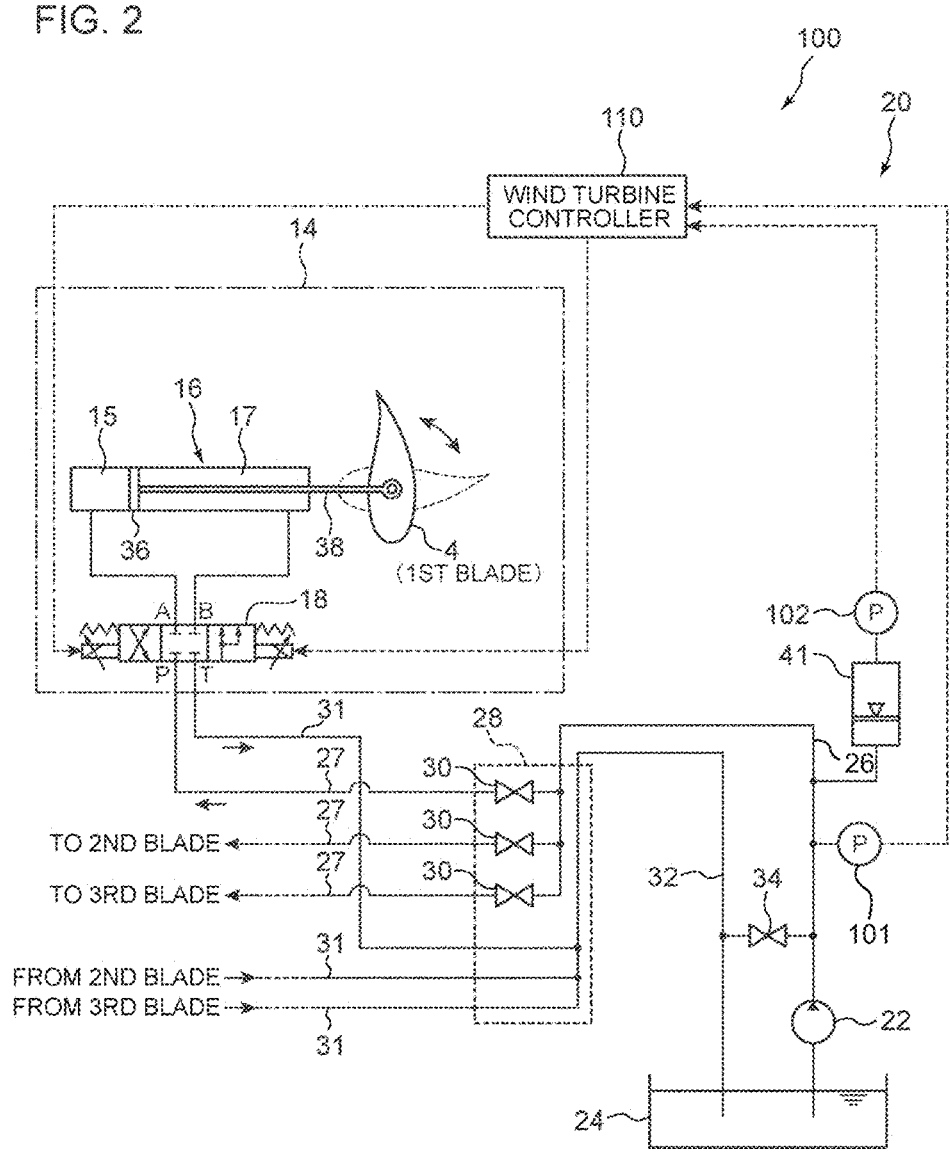
FIG. 2 is a schematic diagram showing a diagnosis system of a wind turbine power generating apparatus according to an embodiment.
Figure 3:
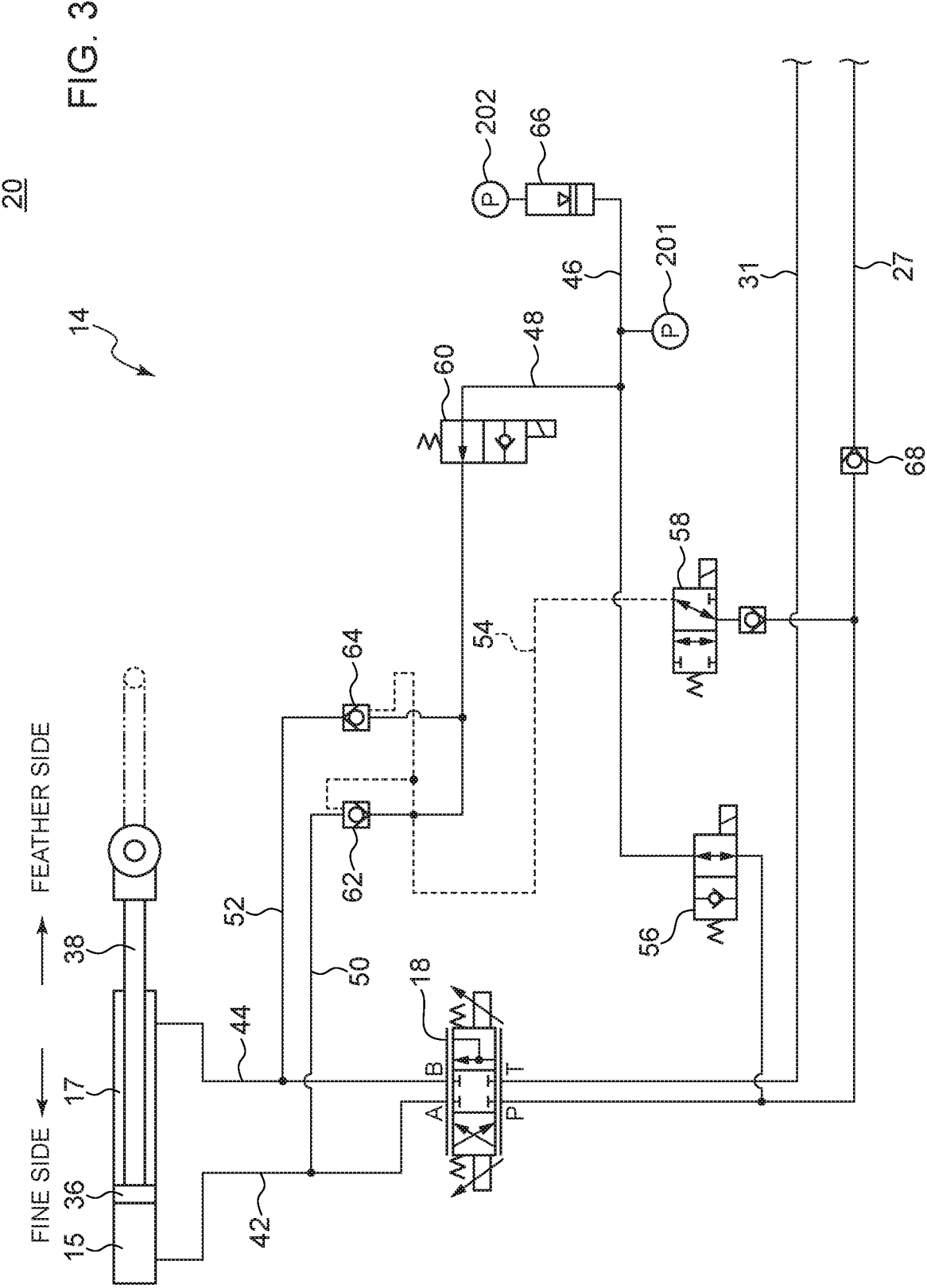
FIG. 3 is a diagram showing in more detail a section corresponding to a pitch drive device, of the diagnosis system shown in FIG. 2.

FIG. 2 is a schematic diagram showing a diagnosis system 100 of the wind turbine power generating apparatus 1 according to an embodiment. FIG. 3 is a diagram showing in more detail a section corresponding to the pitch drive mechanism 14, of the diagnosis system 100 shown in FIG. 2

As shown in FIG. 2, the diagnosis system 100 of the wind turbine power generating apparatus 1 includes a wind turbine controller 110 for operating the hydraulic cylinder 16 as a pitch actuator, and at least one sensor (e.g. pressure sensors 201, 202 shown in FIG. 3, temperature sensor (not shown) disposed inside the nacelle, etc.) for measuring a response value indicating a response to operation of the hydraulic cylinder 16 (pitch actuator).

The wind turbine controller 110 includes a memory for storing the above described response value as data for health check of the blade pitch mechanism 40 described below.

As shown in FIG. 2, the blade pitch mechanism 20 including the hydraulic cylinder 16 includes the pitch drive device 14 including the hydraulic cylinder 16 (pitch actuator) and the hydraulic valve 18, a hydraulic pump 22 as a hydraulic source, a hydraulic oil tank 24 for storing oil, and a supply line 26 disposed between the hydraulic pump 22 and the hydraulic cylinder 16. The oil stored in the oil tank 24 is supplied to the hydraulic cylinder 16 via the supply line 26. Further, the hydraulic cylinder 16 may be disposed on a blade root portion 5 (see FIG. 1) of each of the wind turbine blades 4.

Further, in the embodiment shown in the drawing, the wind turbine power generating apparatus 1 includes three wind turbine blades 4 including the first to third blades, and the pitch drive device 14 is disposed corresponding to each of the three wind turbine blades 4. In FIG. 2, only the pitch drive device 14 corresponding to the first blade is shown, and the pitch drive devices 14 corresponding to the second and third blades are not shown. However, the pitch drive devices 14 corresponding to the second and third blades have the same configuration as the pitch drive device 14 corresponding to the first blade.

Working oil is stored in the oil tank 24 and pressurized by the hydraulic pump 22 to be supplied to the hydraulic valve 18 and the hydraulic cylinder 16 provided for each of the wind turbine blades 4, through the supply line 26 and via a distribution block 28 and a flow-rate regulation valve 30, and further through a branch supply line 27 provided for each of the wind turbine blades 4.

The oil from the hydraulic cylinder 16 provided for each of the wind turbine blades 4 is returned to the oil tank 24 through a branch return line 31 and a return line 32. Further, the supply line 26 and the return line 32 may be connected via a relief valve 34 so that the pressurized oil is discharged to the return line 32 via the relief valve 34 when the pressure of the supply line 26 exceeds a predetermined value so as to prevent the pressure of the supply line 26 from becoming excessively high.

In the supply line 26, an accumulator 41 for accumulating pressurized oil may be disposed. Furthermore, pressure sensors 101, 102 for detecting the pressure of the supply line 26 and the gas pressure of the accumulator 41, respectively, may be provided.

As shown in FIGS. 2 and 3, the hydraulic cylinder 16 includes the first chamber 15 and the second chamber 17 partitioned by a piston 36 that slides inside the hydraulic cylinder 16. The hydraulic cylinder 16 is configured such that the change of the pitch angle of the wind turbine blade 4 can be switched between a change toward the fine side and a change toward the feather side, by switching between the oil supply between supply to the first chamber 15 and supply to the second chamber 17. Specifically, each wind turbine blade 4 is connected to the piston rod 38 of the hydraulic cylinder 16, so that when the piston 36 moves in accordance with the amount of oil supplied to the first chamber 15 or the second chamber 17, the pitch angle of the wind turbine blade 4 connected to the piston rod 38 changes between the fine side and the feather side in accordance with the movement of the piston 36.

The hydraulic valve 18 is disposed in the branch supply line 27, so that the amount of oil supplied to the hydraulic cylinder 16 is adjustable, and the recipient of the oil supply can be switched between the first chamber 15 and the second chamber 17.

In some embodiments, the hydraulic valve 18 is configured such that the hydraulic cylinder (pitch actuator) 16 is driven in response to supply of electric current. In other words, the electric current applied to the hydraulic valve 18 is a driving current for driving the hydraulic cylinder 16 (pitch actuator).

In an embodiment, the hydraulic valve 18 is configured such ha a driving current corresponding to a command value (current command value) for adjusting the pitch angle of the wind turbine blade 4 is applied from the wind turbine controller 110, and thereby switches a hydraulic channel in accordance with a direction into which the pitch angle of the wind turbine blade 4 is to be changed, and the flow rate of the working oil that is to be supplied to the hydraulic cylinder 16 is controlled.

Adjusting the recipient and the amount of oil supply using the above hydraulic valve 18 makes it possible to adjust the pitch angle of the wind turbine blade 4 by a desirable amount in accordance with the amount of oil supply.

In an embodiment, the hydraulic valve 18 is a solenoid proportional control valve capable of controlling the direction by applying input current (driving current) to one of two solenoids, and of controlling the magnitude of the flow rate by changing the magnitude of the input current (driving current).

In an embodiment, the hydraulic valve 18 is a servo proportional valve configured to drive the hydraulic cylinder 16 (pitch actuator) 16 in response to supply of a servo current that serves as a driving current.

As shown in FIG. 3, the pitch drive device 14 provided corresponding to each of the wind turbine blades 4 may include a hydraulic circuit including a variety of valves.

In the pitch drive device 14 shown in FIG. 3, the hydraulic valve 18 being a proportional valve includes four ports: A port, B port, P port, and T port. These ports are connected to the first cylinder line 42 connecting the first chamber 15 and the hydraulic valve 18, the second cylinder line 44 connecting the second chamber 17 and the hydraulic valve 18, the branch supply line 27, and the branch return line 31, respectively. Further, the connection state of each port changes corresponding to the driving current supplied to the hydraulic valve 18.

To the branch supply line 27, a pitch oil line 46 with a pitch accumulator 66 for accumulating pressurized oil disposed therein is connected. An accumulator solenoid valve 56 for changing the communication state between the pitch oil line and the branch supply line 27 is disposed in the pitch oil line 46. The pressurized oil accumulated in the pitch accumulator 66 can be supplied to the first chamber 15 or the second chamber 17 of the hydraulic cylinder 16 via the branch supply line 27 or the communication line 48 as needed.

From the communication line 48 connected to the pitch oil line 46, the first passage 50 and the second passage 52 connected to the first chamber 15 and the second chamber 17 of the hydraulic cylinder 16, respectively, are branched. A solenoid valve 60 for changing the communication state between the pitch oil line 46 and the first passage 50 and the second passage 52 is disposed in the communication line 48. Furthermore, pilot check valves 62, 64 are disposed, respectively, in the first passage 50 and the second passage 52.

The pilot check valves 62, 64 each includes a pilot port to which pilot pressure is applied via a pilot line 54. An emergency valve 58 is disposed between the pilot line 54 and the branch supply line 27 and the branch return line 31. By switching the emergency valve 58, it is possible to switch the pilot pressure applied to the pilot ports of the pilot check valves 62, 64.

In the embodiment shown in the drawings, the emergency valve 58 is a solenoid valve. When the emergency valve 58 is excited, the pilot line 54 and the relatively high-pressure branch supply line 27 become communicable, and the pressure of the branch supply line 27 is applied to the pilot ports of the pilot check valves 62, 64 as a pilot pressure. Furthermore, when the emergency valve 58 is not excited, the pilot line 54 and the relatively low-pressure branch return line 31 become communicable, and the pressure of the branch return line 31 is applied to the pilot ports of the pilot check valves 62, 64 as a pilot pressure.

Hereinafter, "pilot ON" refers to a state in which the pressure of the relatively high-pressure branch supply line 27 is applied to the pilot ports of the pilot check valves 62, 64, and "pilot OFF" refers to a state in which the pressure of the relatively low-pressure branch return line 31 is applied to the same as the pilot pressure.

The pilot check valve 62 functions as a check valve which shuts off a flow of pressurized oil between the communication line 48 and the first passage 50 at the time of "pilot ON", and which permits a flow of pressurized oil from the communication line 48 to the first passage 50 at the time of "pilot OFF".

The pilot check valve 64 functions as a check valve which shuts off a flow of pressurized oil between the communication line 48 and the second passage 52 at the time of "pilot ON", and which permits a flow of pressurized oil from the second passage 52 to the communication line 48 at the time of "pilot OFF".

A check valve 68 is disposed in the branch supply line 27, and is configured to bring the supply line 26 and the branch supply line 27 into a non-communication state when the pressure of pressurized oil supplied from the supply line 26 decreases.

Furthermore, pressure sensors 201 for detecting the pressure of the pitch oil line and the gas pressure of the accumulator, respectively, may be disposed in the pitch oil line 46 and the pitch accumulator 66.

Next, operation of the pitch drive device 14 in adjustment of the pitch angle of the wind turbine blade 4 will be described briefly.

During normal operation of the wind turbine power generating apparatus 1, to change the pitch angle of the wind turbine blade 4 to the fine side, a driving current is applied to the hydraulic valve 18 to operate so that the P port and the B port of the hydraulic valve 18 are connected to each other, and the T port and the A port are connected to each other. Accordingly, the pressurized oil from the branch supply line 27 is guided to the second chamber 17 of the hydraulic cylinder 16 via the P port, the B port, and the second cylinder line 44, and the pressurized oil in the first chamber 15 is guided to the branch return line 31 via the first cylinder line 42, the A port, and the T port. Accordingly, the piston 36 and the piston rod 38 of the hydraulic cylinder 16 move toward the first chamber 15, and the pitch angle of the wind turbine blade 4 changes toward the fine side.

During normal operation of the wind turbine power generating apparatus 1, to change the pitch angle of the wind turbine blade 4 to the feather side, a driving current is applied to the hydraulic valve 18 to operate so that the P port, the A port, and the B port of the hydraulic valve 18 are connected to one another. Accordingly, the pressurized oil from the branch supply line 27 is guided to the first chamber 15 of the hydraulic cylinder 16 via the P port, the A port, and the first cylinder line 42, and the pressurized oil in the second chamber 17 is guided to the first chamber 15 via the first cylinder line 42, the A port, and the B port. Accordingly, the piston 36 and the piston rod 38 of the hydraulic cylinder 16 move toward the second chamber 17, and the pitch angle of the wind turbine blade 4 changes toward the feather side.

Furthermore, during normal operation of the wind turbine power generating apparatus 1, pressurized oil from the supply line 26 is supplied to the pitch drive device 14 via the check valve 68. Further, the accumulator solenoid valve 56 is excited, and the pitch oil line 46 and the branch supply line 27 are brought into communication. Accordingly, the pressures of the pitch accumulator 66 and the branch supply line 27 become substantially the same, and pressurized oil is accumulated in the pitch accumulator 66. Furthermore, the emergency valve 58 is excited, and thereby the pilot check valves 62, 64 each enter a closed state.

In emergency of the wind turbine power generating apparatus 1, to change the pitch angle of the wind turbine blade 4 to the feather side, a driving current applied to the hydraulic valve 18 is changed to zero to operate so as to shutoff connection between the branch supply line 27, the branch return line 31, the first cylinder line 42, and the second cylinder line 44. Furthermore, the emergency valve 58 is brought into a non-excited state, and thereby the pilot check valves 62, 64 each function as a check valve, thus permitting a flow of pressurized oil in a predetermined direction as described above. At this time, the solenoid valve 60 is brought into a non-excited state, and the pressurized oil accumulated in the pitch accumulator 66 is guided to the first chamber 15 of the hydraulic cylinder via the communication line 48 and the first passage 50. Furthermore, the pressurized oil inside the second chamber 17 of the hydraulic cylinder is guided to the first chamber 15 via the second passage 52 and the first passage 50. Accordingly, the piston 36 and the piston rod 38 of the hydraulic cylinder 16 move toward the second chamber 17, and the pitch angle of the wind turbine blade 4 changes toward the feather side.

To diagnose the wind turbine power generating apparatus 1 described above, diagnosis methods according to some embodiments can be applied.

Figure 4:
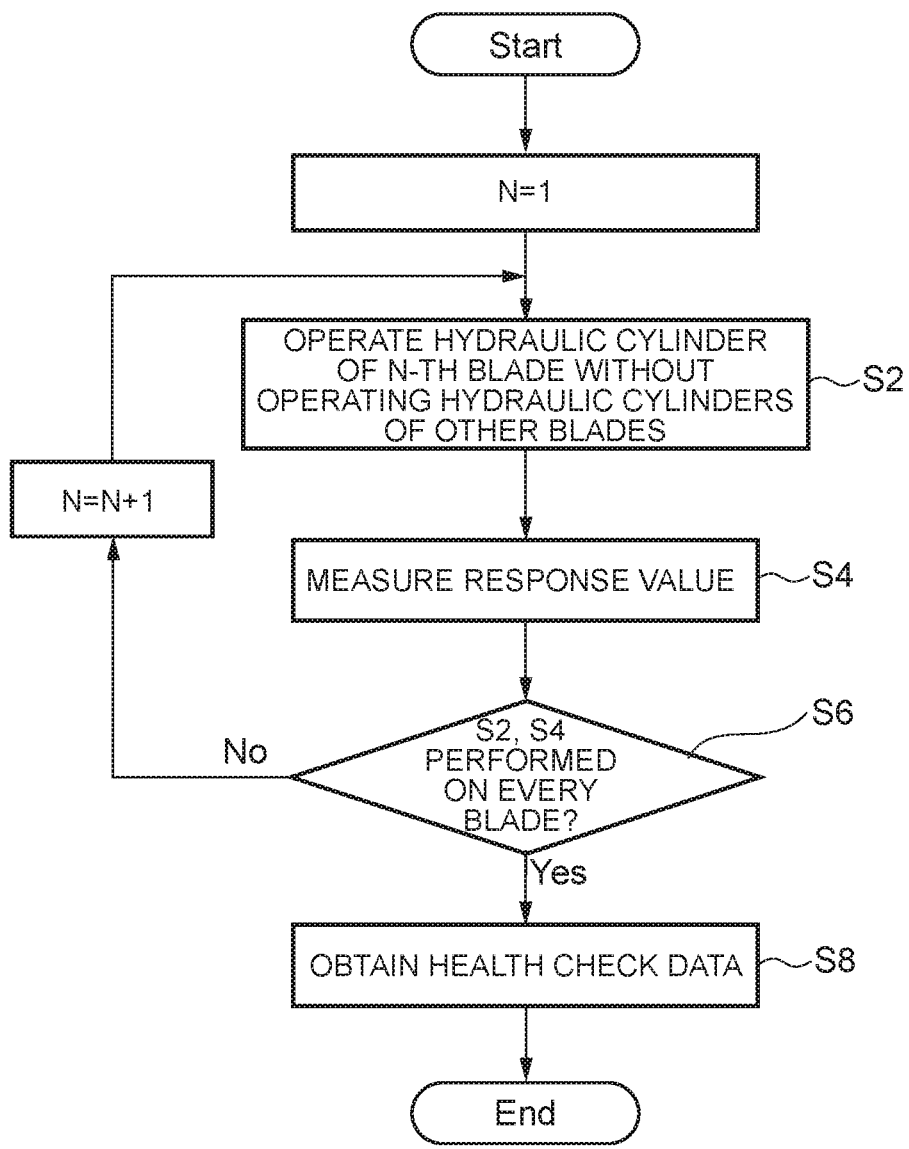
FIG. 4 is a flowchart of a diagnosis method according to some embodiments.

FIG. 4 is a flowchart of a diagnosis method according to some embodiments.

As shown in FIG. 4, in diagnosis methods according to some embodiments, the hydraulic cylinder 16 (pitch actuator) corresponding to one of the wind turbine blades 4 (herein, the first blade) of the wind turbine power generating apparatus 1 is operated without operating the hydraulic cylinders 16 (pitch actuators) corresponding to the wind turbine blades 4 (the second blade and the third blade, for instance) other than the one of the wind turbine blades 4 (operation step S2).

Next, a response value is measured, which indicates a response to operation of the pitch actuator corresponding to the one of the wind turbine blades 4 (herein, the first blade) for which the hydraulic cylinder 16 (pitch actuator) is operated in step S2 (measurement step S4).

Further, the operation step S2 and the measurement step S4 described above are performed repeatedly for each of the plurality of wind turbine blades 4 (that is, for the second blade and the third blade) (step S6), and the response value measured in step S2 for each wind turbine blade 4 is obtained as data for health check of the blade pitch mechanism 20 (step S8).

In the above described diagnosis method, data for health check of the blade pitch mechanism 20 is obtained for each of the wind turbine blades 4, in a state where the hydraulic cylinders (pitch actuators) 16 of the wind turbine blades 4 other than the wind turbine blade (one of the wind turbine blades) for which data for heath check is to be obtained from among the plurality of wind turbine blades 4 are not operated. Accordingly, it is possible to operate the hydraulic cylinder 16 (pitch actuator) of the wind turbine blade 4 to be diagnosed in a state where influence of operation of the hydraulic cylinders 16 (pitch actuators) corresponding to the other wind turbine blades 4 than the wind turbine blade 4 to be diagnosed is reduced, and obtain a response value corresponding to the operation. Thus, it is possible to diagnose in detail the blade pitch mechanism 20 of the wind turbine power generating apparatus 1 including a plurality of wind turbine blades 4 by using data for health check including a response value obtained as described above.

Furthermore, in the diagnosis method described above, from among the plurality of wind turbine blades 4, for the wind turbine blades 4 other than the wind turbine blade 4 for which data for health check is to be obtained, the hydraulic cylinders 16 are not operated and the wind turbine blades 4 are maintained in a state of being in the feather position, and in this state, a response value is obtained for the blade pitch mechanism 20 of the wind turbine blade 4 for which data of health check is to be obtained, and thereby it is possible to obtain data for health check in a state where the rotation speed of the wind turbine rotor 2 is reduced. In other words, it is possible to obtain data for health check in a state where a wind load applied to the wind turbine blade 4 is reduced, and thereby it is possible to diagnose the blade pitch mechanism 20 even more accurately.

Hereinafter, a method of diagnosing the wind turbine power generating apparatus 1 according to some embodiments will be described, with reference to FIGS. 5 to 9.

Figure 5:
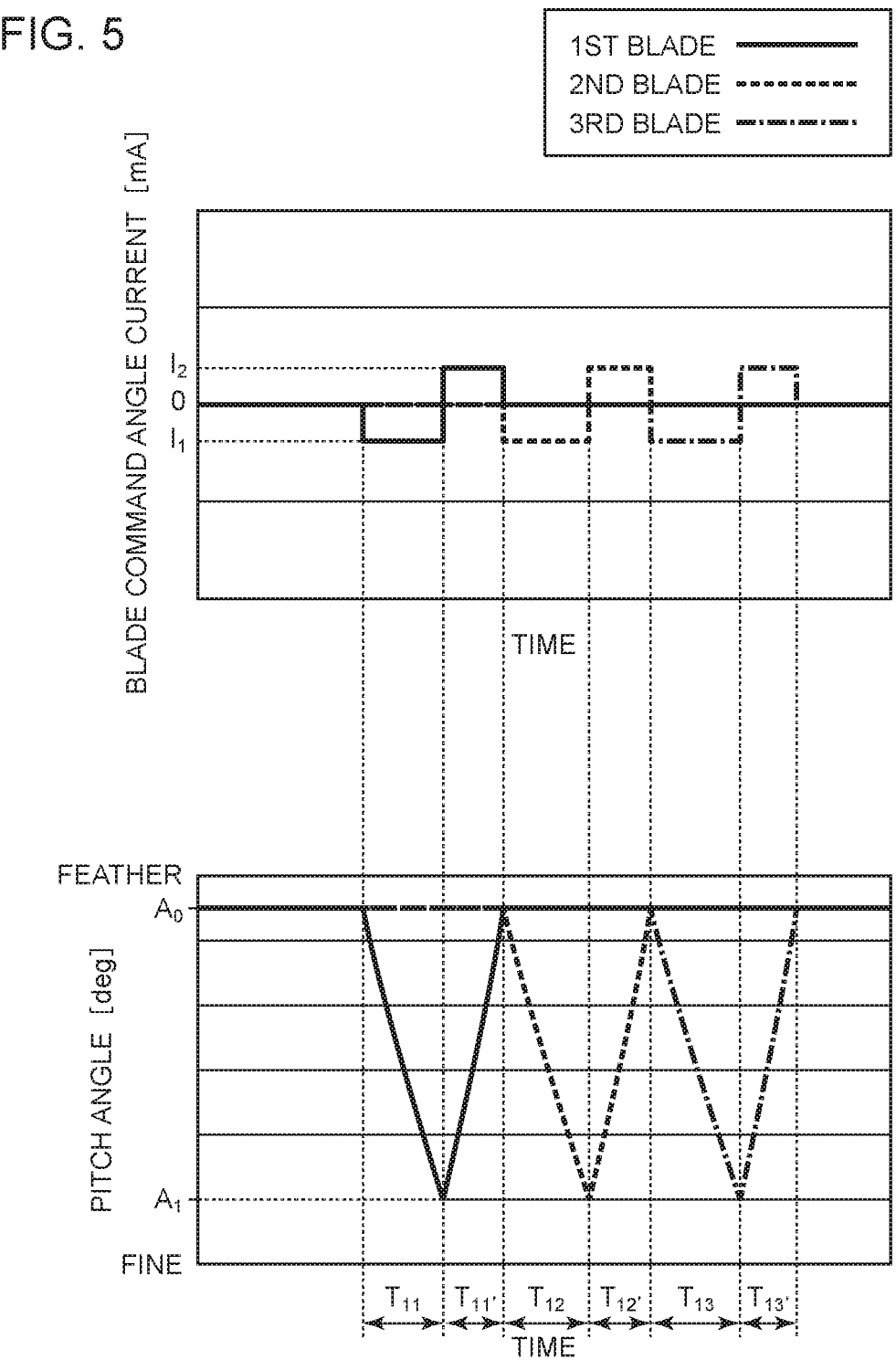
FIG. 5 is a graph showing an example the temporal change of the command value of the driving current of the hydraulic valve (proportional valve) and the pitch angle of the wind turbine blade in a wind turbine power generating apparatus according to an embodiment.

FIG. 5 is a graph showing an example of the temporal change of the command value of the driving current of the hydraulic valve 18 and the pitch angle of the wind turbine blade 4 in the wind turbine power generating apparatus 1 according to an embodiment.

In some embodiments, as a response value corresponding to operation of the hydraulic cylinder 16 (pitch actuator) measured in the measurement step S2, a first period of time required to change the pitch angle of the wind turbine blade 4 to a first target value is measured in a state where a driving current for driving the hydraulic cylinder 16 (pitch actuator) corresponding to each wind turbine blade 4 is maintained to be constant. Furthermore, in step S8, data for health check of the blade pitch mechanism 20 including at least the above described first period of time is obtained.

When some abnormality is occurring in the blade pitch mechanism 20, a pitch rate in a case where a predetermined driving current is supplied to the pitch actuator may be different from that during normal operation of the blade pitch mechanism 20. In this case, the time required to change the pitch angle for a certain degree in a state where the driving current of the pitch actuator is maintained to be constant is different from that during normal operation of the blade pitch mechanism 20.

Thus, it is possible to appropriately diagnose the blade pitch mechanism 20 on the basis of the first period of time by obtaining, as data for health check of the blade pitch mechanism 20, the first period of time required to change the pitch angle of the wind turbine blade 4 to the first target value in a state where a driving current of the pitch actuator is kept constant for each of the wind turbine blades 4.

For instance, as an example of the present embodiment, in the example shown in FIG. 5, a command value I1 of a constant driving current for driving the pitch angle to the fine side is used as the command value f the driving current to be applied to the hydraulic valve 18 of the hydraulic cylinder 16.

In steps S2 to S6, firstly, while the above command value of the driving current is maintained at zero (that is, the pitch angle is unchanged) for the second and third blades, for the first blade, the first period of time T11 required to change the pitch angle of the first blade to the first target value A1 on the feather side from the reference value A0 in a state where the command value I1 of the driving current is maintained to be constant is measured.

Next, while the above command value of the driving current is maintained at zero (that is, the pitch angle is unchanged) for the first and third blades, for the second blade, the first period of time T12 required to change the pitch angle of the second blade to the first target value A1 on the fine side from the reference value A0 in a state where the command value I1 of the driving current is maintained to be constant is measured.

Similarly, also for the third blade, the first period of time T13 required to change the pitch angle of the third blade to the first target value A1 from the reference value A0 is measured.

Furthermore, in step S8, the first period of times T11, T12, and T13 of the first, second, and third blades, respectively, obtained as described above are obtained as for health check of the blade pitch mechanism 20.

By using the data for health check, in a case where the first period of time T1 of the first blade is longer than the first period of times T12 and T13 of the second and third blades, it can be determined that some abnormality may be occurring in the blade pitch mechanism 20 in the first blade.

Alternatively, in a case where the above data for health check is obtained a plurality of times, regularly or at a certain timing (e.g. at a startup of the wind turbine), if the first period of time T12 of a particular wind turbine blade 4, the second blade for instance, is longer than the first period of time T2 of the second blade in the past, it can be determined that some abnormality may be occurring in the blade pitch mechanism 20 in the second blade.

Further, in some embodiments, as the command of a constant driving current to be applied to the hydraulic valve 18 of the hydraulic cylinder 16, a command value I2 of the driving current for driving the pitch angle to the feather side may be used. In this case, the first period of time T1', T2', and T3' (see FIG. 5) required to change the pitch angle of each wind turbine blade 4 from the reference value (e.g. A1 in FIG. 5) to the first target value on the feather side (e.g. A0 in FIG. 5) may be measured as response values for the first to third blades, and obtained as data for health check of the blade pitch mechanism 20.

Figure 6:
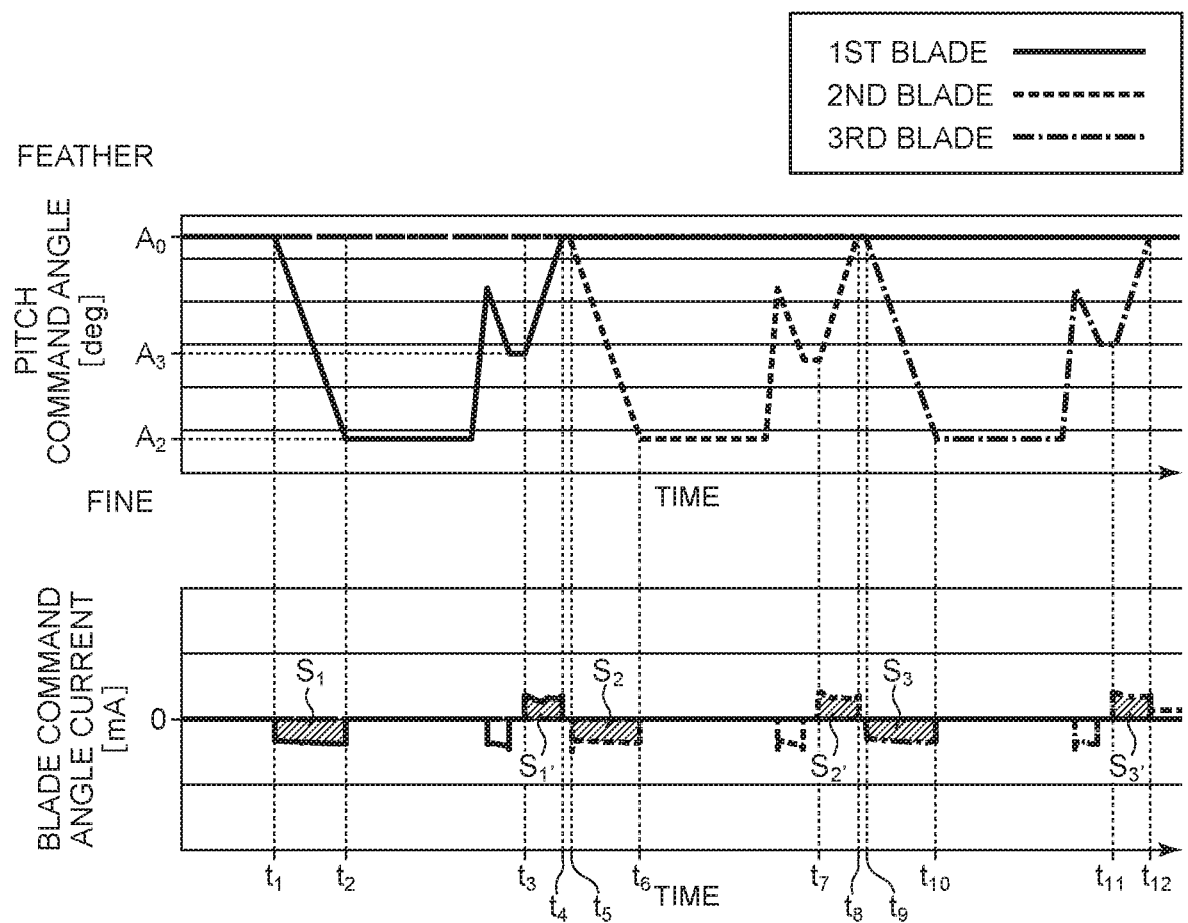
FIG. 6 is a graph showing an example of the temporal change of the pitch command angle from a wind turbine controller and the command value of the driving current of the hydraulic valve (proportional valve), for a wind turbine power generating apparatus according to an embodiment.

FIG. 6 is a graph showing an example of the temporal change of the pitch command angle and the command value of the driving current of the hydraulic valve 18 from the wind turbine controller, in the wind turbine power generating apparatus 1 according to an embodiment.

In some embodiments, as a response value corresponding to operation of the hydraulic cylinder 16 (pitch actuator) measured in the measurement step S2, measured is a time integrated value of the driving current in a case where a feedback control is performed on the driving current for driving the hydraulic cylinder 16 (pitch actuator) corresponding to each wind turbine blade 4 is controlled so that the pitch angle of each wind turbine blade 4 changes at a constant rate. Furthermore, in step S8, data for health check of the blade pitch mechanism 20 including at least the above described time integrated value is obtained.

When some abnormality is occurring in the blade pitch mechanism 20, a driving current of the pitch actuator required to change the pitch angle at a constant pitch rate may be different from that during normal operation of the blade pitch mechanism 20.

Thus, by obtaining a time integrated value of a driving current of the pitch actuator in a case where a feedback control is performed on the driving current so that the pitch angle changes at a constant rate for each of the wind turbine blades 4 as data for health check, it is possible to appropriately diagnose the blade pitch mechanism 20 on the basis of the time integrated value of the driving current.

For instance, as an example of the present embodiment, in the example shown in FIG. 6, in steps S2 to S6, firstly, while the command value of the driving current is maintained at zero (that is, the pitch angle is unchanged) for the second and third blades, a feedback control is performed on the driving current of the hydraulic cylinder 16 (pitch actuator) for the first blade, so as to change the pitch angle of the wind turbine blade 4 from A0 on the feather side to A2 on the fine side at a constant pitch rate. Further, a time integrated value of the driving current from the time t1 when the pitch command angle starts changing from A0 to the fine side to the time t2 when the pitch command angle reaches A2, that is, the area of section S1 in FIG. 6, is calculated.

Next, similarly for the second and third blades, a time integrated value of the driving current when a feedback control is performed on the driving current of the hydraulic cylinder 16 (pitch actuator) so as to change the pitch angle of the wind turbine blade 4 from A0 on the feather side to A2 on the fine side at the same constant rate as the case of the first blade, that is the areas of sections S2 and S3, in FIG. 6 are calculated.

In each of the first to third blades, the above time integrated value of the driving current is calculated at the same pitch rate, and thus the time that elapses before the pitch command angle changes from A0 to A2 (the length of periods t1 to t2, t5 to t6, and t9 to t10, for the first, second, and third blades, respectively) is substantially the same.

Furthermore, in step S8, the time integrated values S1, S2, and S3 of the driving current of the first, second, and third blades, respectively, obtained as described above, are obtained as data for health check of the blade pitch mechanism 20.

By using the data for health check, in a case where the time integrated value S1 of the driving current of the first blade is greater than the time integrated values S2 and S3 of the driving current of the second and third blades, it can be determined that some abnormality may be occurring in the blade pitch mechanism 20 in the first blade.

Alternatively, in a case where the above data for health check is obtained a plurality of times, regularly or at a certain timing (e.g. at a startup of the wind turbine), if the time integrated value S2 of the driving current of a particular wind turbine blade 4, the second blade for instance, is greater than the time integrated value T2 of the driving current of the second blade in the past, it can be determined that some abnormality may be occurring in the blade pitch mechanism 20 of the second blade.

Furthermore, in some embodiments, in steps S2 to S6, for the wind turbine blade 4 to be diagnosed, a feedback control may be performed on the driving current of the pitch actuator so as to change the pitch angle of the wind turbine blade 4 at a constant pitch rate, from the angle on the fine side (e.g. A3 in FIG. 6) to the angle on the feather side (e.g. A0 in FIG. 6). Further, a time integrated value of the driving current from the time when the pitch command angle starts changing from A3 toward the feather side (t3, t7, t11 in FIG. 6) to the time when the pitch command angle reaches A0 (t4, t8, t12 in FIG. 6), that is, the area of each of the sections S1', S2', S3' in FIG. 6, may be calculated and obtained as data for health check of the blade pitch mechanism 20.

Figure 7:
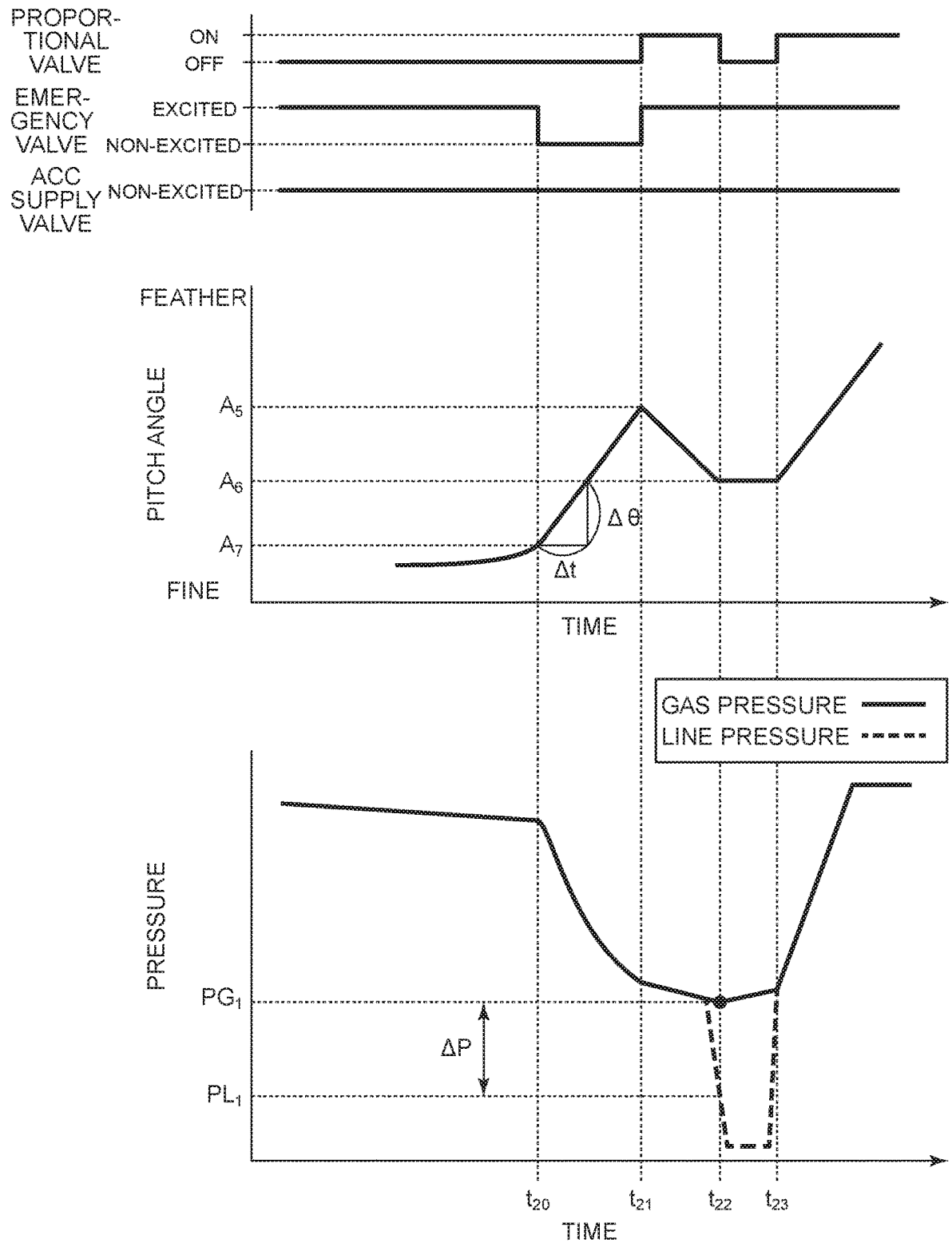
FIG. 7 is a graph showing an example of the temporal change of the position of each valve, the pitch angle of wind turbine blades, the gas pressure of the pitch accumulator, and the pressure of oil in the pitch oil line, for a wind turbine blade of a wind turbine power generating apparatus according to an embodiment.

FIG. 7 is a graph showing an example of the temporal change of the position of the hydraulic valve 18 (proportional valve), the emergency valve 58, and the accumulator solenoid valve 56 (Ace supply valve), the pitch angle of wind turbine blades 4, the gas pressure of the pitch accumulator 66, and the pressure of oil in the pitch oil line 46, of one of the wind turbine blades 4 of the wind turbine power generating apparatus 1 according to an embodiment (see FIG. 3). The gas pressure of the pitch accumulator 66 and the pressure of oil in the pitch oil line 46 can be obtained by the pressure sensors 200, 201, respectively (see FIG. 3).

In some embodiments, in steps S2 to S6, during a period in which the hydraulic cylinder 16 (pitch actuator) corresponding to one of the pitch accumulators 66 provided for the respective wind turbine blades 4 is operated to the feather side with pressurized oil supplied from the one of the pitch actuators 66, and then the hydraulic cylinder 16 (pitch actuator) is operated to the fine side or the feather side only with pressurized oil supplied from the one of the pitch accumulators 66, the pressure PG of oil in the pitch oil line 46 including the one of the pitch accumulators 66 disposed therein and the gas pressure PL of the one of the pitch accumulators 66 are measured. Then, in step S8, the gas pressure PG1 at the time when a difference $\Delta P$ between the gas pressure PG of the pitch accumulator 66 and the oil pressure PL of the pitch oil line 46 reaches a set value is obtained as data for health check of the blade pitch mechanism 20.

If the pitch accumulator 66 is normal when pressurized oil accumulated in the pitch accumulator 66 is discharged and there is no more pressurized oil that can be supplied to the hydraulic cylinder 16 (pitch actuator) from the pitch accumulator 66, the gas pressure PG of the pitch accumulator 66 is an initially charged pressure PG0. However, if an abnormality is occurring in the pitch accumulator 66, the gas pressure PG of the pitch accumulator 66 may be different from the initially charged pressure PG0.

Thus, by discharging pressurized oil accumulated in the pitch accumulator 66 corresponding to each wind turbine blade 4 by operating the hydraulic cylinder 16 (pitch actuator) and obtaining, as data for health check of the blade pitch mechanism 20, the gas pressure PG1 at the time when a difference $\Delta P$ between the gas pressure PG of the pitch accumulator 66 and the pressure PL of the pitch oil line 46 including the pitch accumulator 66 disposed therein reaches a set value (i.e. when pressurized oil in the pitch accumulator 66 can be regarded as exhausted) as data for health check of the blade pitch mechanism 20, it is possible to appropriately diagnose the hydraulic cylinder 16 (pitch accumulator) (blade pitch mechanism 29) by using the gas pressure PG1.

For instance, as an example of the present embodiment, in the example shown in FIG. 7, in steps S2 to S6, the gas pressure PG of the pitch accumulator 66 and the line pressure PL, of the pitch oil line are measured for the first blade, without operating the hydraulic cylinder 16 (pitch actuator) corresponding to the second blade and the third blade.

In the period from time t20 to t23 shown in FIG. 7, the relief valve 34 (see FIG. 2) is open. Accordingly, pressurized oil generated in the hydraulic pump 22 is returned to the oil tank 24 through the return line 32 via the relief valve 34, and the check valve 68 is closed due to the pressure difference across the check valve 68 in the branch supply line 27, such that pressurized oil from the supply line 26 is not supplied to the pitch drive device 14 of each wind turbine blade 4.

In the pitch drive device 14 corresponding to the first blade, in the period from time t20 to t21 shown in FIG. 7, the emergency valve 58 (solenoid valve) is brought into a non-excited state, and thereby the pilot check valves 62, 64 start functioning as check valves, and the pressurized oil accumulated in the pitch accumulator 66 is introduced into the first chamber 15 of the hydraulic cylinder 16 (pitch actuator) via the communication line 48 and the first passage 50, and the hydraulic cylinder 16 is operated toward the feather side. At this time, the pitch angle of the first blade is A5. Meanwhile, pressurized oil of the pitch accumulator 66 is consumed gradually, and the gas pressure PG of the pitch accumulator 66 and the line pressure PL of the pressurized oil decrease gradually.

Then, at time t21, the emergency valve 58 is excited and an exciting current toward the feather side is applied to the hydraulic valve 18 (proportional valve), and thereby pressurized oil remaining in the pitch accumulator 66 is guided into the second chamber 17 via the branch supply line 27 and the hydraulic valve 18. That is, only with pressurized oil supplied from the pitch accumulator 66, the hydraulic cylinder 16 is operated toward the fine side. Then, the gas pressure PG1 at the time when a difference ΔP between the gas pressure PG of the pitch accumulator 66 and the pressure PL of the oil of the pitch oil line 46 reaches a set value (time t22 in FIG. 7) is obtained as data for health check of the blade pitch mechanism. (step S8). The pitch angle of the wind turbine blade 4 at time t22 is A5.

If pressurized oil inside the pitch accumulator 66 becomes exhausted, the pressure of the pitch oil line 46 with the pitch accumulator 66 disposed therein tends to decrease rapidly, and thus pressurized oil of the pitch accumulator 66 can be regarded as exhausted when the above described difference ΔP between the gas pressure PG and the line pressure PL increases to a predetermined value or higher.

Next, also for the second blade and the third blade, similarly to the case of the first blade, the gas pressure PG1 at the time when a difference ΔP between the gas pressure PG of the pitch accumulator 66 and the pressure PL of the oil of the pitch oil line 46 reaches a set value (time t22 in FIG. 7) is obtained as data for health check of the blade pitch mechanism 20.

If the pitch accumulator 66 is normal, the above described gas pressure PG1 should be substantially the same as the initially charged pressure of the pitch accumulator 66. Thus, for instance, if the gas pressure PG1 obtained as data for health check for the first blade is lower than the initially charged pressure, it can be determined that an abnormality is occurring in the pitch accumulator 66 corresponding to the first blade.

In some embodiments, an index of the temperature of gas of the pitch accumulator 66 at the time when a difference ΔP between the gas pressure PG and the line pressure PL obtained as described above reaches a set value (time t22 in FIG. 7). Then, the gas pressure GL at the time t22 and an index of the temperature of gas at the same time t22 are obtained as data for health check of the pitch accumulator 66.

Further, the pitch accumulator 66 is diagnosed on the basis of correlation between the gas pressure GL and the index of the temperature at the time t22.

In some embodiments, as the index of the temperature of gas of the pitch accumulator 66, the nacelle interior temperature obtained by a temperature sensor (not shown) disposed inside the nacelle 11 (see FIG. 1) may be used.

Figure 8:
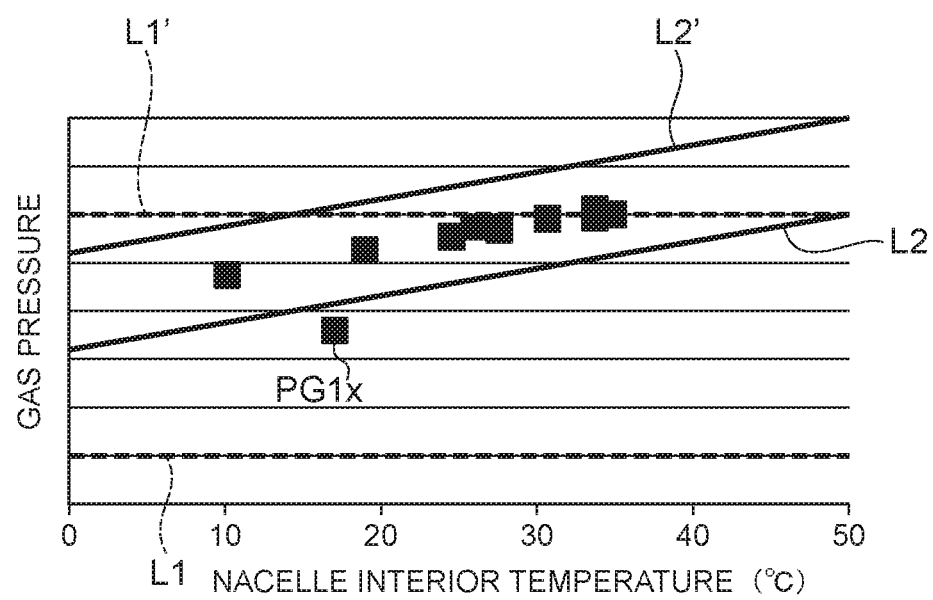
FIG. 8 is a graph showing a relationship between the gas pressure of the pitch accumulator and the nacelle interior temperature of a particular wind turbine blade of a wind turbine power generating apparatus according to an embodiment.

FIG. 8 is a graph showing a relationship between the gas pressure PG of the pitch accumulator 66 and the nacelle interior temperature of a particular wind turbine blade 4 (the first blade, for instance) of the wind turbine power generating apparatus 1 according to an embodiment, obtained a plurality of times as described above. The gas pressure PG and the nacelle interior temperature may be obtained regularly or at every predetermined timing. For instance, the above parameters may be obtained at a startup every time the wind turbine power generating apparatus 1 is started.

The gas pressure of a pitch accumulator changes with temperature, even if conditions other than the temperature stay constant. Thus, if the pitch accumulator is diagnosed on the basis of the gas pressure PG without to into account the gas temperature, it may be impossible to perform appropriate diagnosis.

For instance, the lines L1, L1' and the lines L2, L2' in FIG. 8 are lines indicating the lower limit value and the upper limit value of the gas pressure for determining whether the gas pressure PG is in an appropriate range. While the lines L1, L1' are at a constant pressure value regardless of the temperature, the lines L2, L2' show change in the pressure value depending on the temperature, on the basis of the state equation of gas.

In a case where a plurality of sets of data of the gas pressure PG1 are obtained as shown in FIG. 8, each point showing PG1 is included in the range not lower than the line L1 being the lower limit value and not higher than the line L1' being the upper limit value, which do not depend on the temperature. Thus, by evaluation using the lines L1, L1', it would be determined that there is no abnormality occurring in the pitch accumulator 66.

Meanwhile, by evaluation using the lines L2, L2' depending on the temperature, most of the points each representing PG1 are included in the range not lower than the line L2 being the lower limit value and not higher than the line L2' being the upper limit value, but the point PG ix shown in the graph is not within this range. Thus, when PG1x is obtained as the above described gas pressure PG1, it can be determined that there is an abnormality occurring in the pitch accumulator 66 at the time.

As described above, it is possible to diagnose the pitch accumulator 66 accurately by diagnosing the pitch accumulator 66 on the basis of correlation between the gas pressure PG1 at the time t22 when a difference ΔP between the gas pressure PG of the pitch accumulator 66 and the line pressure PL of the pitch oil line 46 reaches a set value (i.e. time t22 when pressurized oil in the accumulator can be regarded as exhausted) and the index of the temperature of gas in the pitch accumulator 66 at the time t22. Accordingly, it is possible to detect even an abnormality of the accumulator 66 that can be overlooked in diagnosis based on a threshold of the gas pressure PG1 that does not depend on the gas temperature (e.g. diagnosis based on the above described lines L1, L1').

In some embodiments, the second period of time required to change the pitch angle of each wind turbine blade 4 to the second target value may be obtained as data for health check of the emergency valve 58, by operating the hydraulic cylinder 16 (pitch actuator) to the feather side with pressurized oil supplied by operation of the emergency valve 58 from the plurality of pitch accumulators 66 disposed corresponding to the respective wind turbine blades 4 (first to third blades).

More specifically, the emergency valve 58 (see FIG. 3) is brought into a non-excited state, and thereby the pilot check valves 62, 64 are allowed to function as check valves, and the pressurized oil accumulated in the pitch accumulator 66 is introduced into the first chamber 15 of the hydraulic cylinder 16 (pitch actuator) via the communication line 48 and the first passage 50. Accordingly, by operating the hydraulic cylinder 16 to the feather side, and the second period of time required to change the pitch angle of each wind turbine blade 4 from a reference value to the second target value on the feather side may be obtained.

Furthermore, the step of obtaining the second period of time by operating the pitch actuator to the feather side with the emergency valve 58 may be performed for each one of the plurality of wind turbine blades 4 in turn, or for two or more of the plurality of wind turbine blade 4 at the same time.

Normally, a wind turbine power generating apparatus is designed to, at the time of emergency, operate the emergency valve so that the pitch actuator operates to the feather side with pressurized oil from the pitch accumulator 66, and change the pitch angle of each wind turbine blade 4 to a predetermined angle within a predetermined time.

In the above embodiment, it is possible to perform appropriate health check on the emergency valve on the basis of the second period of time required to change the pitch angle to the second target value, by operating the emergency valve 58 to operate the pitch actuator to the feather side.

In some embodiments, the third period of time required to change the pitch angle of the wind turbine blades 4 to the third target value may be obtained as data for health check of the accumulator solenoid valve 56, by operating the hydraulic cylinder 16 (pitch actuator) to the fine side of feather side with pressurized oil supplied via the accumulator solenoid valve 56 from the plurality of pitch accumulators 66 disposed corresponding to the respective wind turbine blades 4.

More specifically, by opening the relief valve 34 (see FIG. 2), the accumulator solenoid valve 56 (see FIG. 3) is excited in a state where pressurized oil from the supply line 26 is not supplied to the pitch drive device 14 of each wind turbine blade 4, and a driving current is applied to the hydraulic valve 18 (proportional valve) so as to operate to the fine side or the feather side. Accordingly, the third period of time require to change the pitch angle to the third target value from a predetermined reference value may be obtained by operating the hydraulic cylinder 16 by guiding pressurized oil from the pitch accumulator 66 to the first chamber 15 or the second chamber 17 of the hydraulic cylinder 16 via the accumulator solenoid valve 56 and the hydraulic valve 18 (proportional valve).

Furthermore, as described above, the step of obtaining the third period of time by supplying pressurized oil from the pitch accumulator 66 to the hydraulic cylinder 16 via the accumulator solenoid valve 56 to operate the hydraulic cylinder 16 may be performed for each one of the plurality of wind turbine blades 4 in turn, or for two or more of the plurality of wind turbine blade 4 at the same time.

As described above, it is possible to diagnose the accumulator solenoid valve 56 appropriately on the basis of the third period of time required to change the pitch angle of each wind turbine blade 4 to the third target value by operating the hydraulic cylinder 16 (pitch actuator) with pressurized oil supplied via the accumulator solenoid valve 56 from the pitch accumulator 66.

In some embodiments, pressure of the branch supply line 27 (oil supply line) at each of the start and end of a predetermined period may be obtained as data for health check of the hydraulic valve 18 (proportional valve), while supply of pressurized oil to the branch supply line 27 (oil supply line) and discharge of pressurized oil from the branch supply line 27 (oil supply line) are stopped.

Herein, to stop supply of pressurized oil to the branch supply line 27 (oil supply line) and discharge of pressurized oil from the branch supply line 27 (oil supply line), the relief valve 34 (see FIG. 2) may be opened to bring the check valve 68 into a closed state by pressure difference across the check valve 68 in the branch supply line 27.

Further, the pressure in the branch supply line 27 (oil supply line) may be obtained by a pressure sensor (not shown) disposed in the branch supply line 27, or may be obtained by a pressure sensor 201 disposed in the pitch oil line 46 in a state where the accumulator solenoid valve 56 is excited and the branch supply line 27 and the pitch oil line 46 are in communication.

As described above, by obtaining pressure of the branch supply line 27 (oil supply line) at each of the start and end of a predetermined period as data for health check, while supply of pressurized oil to the branch supply line 27 (oil supply line) and discharge of pressurized oil from the branch supply line 27 (oil supply line) are stopped, it is possible to calculate the reduction amount of the oil supply line pressure per unit time, that is, the leak amount of pressurized oil from the branch supply line 27 (oil supply line) via the hydraulic valve 18 (proportional valve), on the basis of the data for health check. Accordingly, it is possible to diagnose the hydraulic valve 18 (proportional valve) appropriately.

Figure 9:
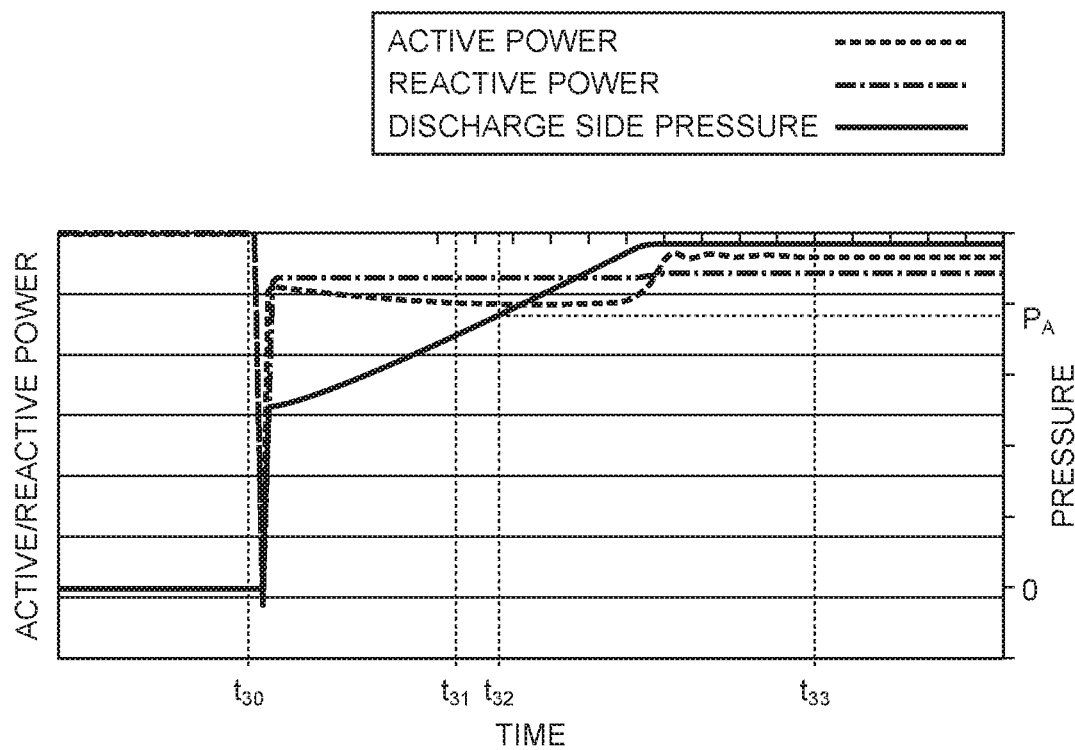
FIG. 9 is a diagram of an example of the temporal change of active power and reactive power of the hydraulic pump, and the pressure of the supply line on the discharge side of the hydraulic pump, for a wind turbine power generating apparatus according to an embodiment.

FIG. 9 is a diagram of an example of the temporal change of the active power and reactive power of the hydraulic pump 22 (see FIG. 2), and the pressure of the supply line 26 on the discharge side of the hydraulic pump 22, in the wind turbine power generating apparatus 1 according to an embodiment. In FIG. 9, time t30 is the time when the hydraulic pump 22 is started.

In some embodiments, data related to active power or reactive power of the hydraulic pump 22 at the time after elapse of a predetermined time after the time t30 (see FIG. 9) when the hydraulic pump 22 (pump: see FIG. 2) for producing pressurized oil to be supplied to the hydraulic cylinder 16 (pitch actuator) is started, or a period from time t30 when the hydraulic pump 22 is started to time t32 when pressure in the supply line 26 on the discharge side of the hydraulic pump 22 reaches a predetermined value PA may be further obtained as data for health check of the hydraulic pump 22.

Pressure of the supply line 26 on the discharge side of the hydraulic pump 22 may be obtained by the pressure sensor 101 (see FIG. 2) disposed in the supply line 26.

In an embodiment, as data related to active power of the hydraulic pump 22, the peak value of active power after the hydraulic pump 22 is started, active power at time 31 in a period during which pressure of the supply line 26 on the discharge side is increasing after elapse of a predetermined time after time t30 when the hydraulic pump 22 is started, or active power at time t33 (herein, t31<t33) after elapse of a predetermined time after time t30 when the hydraulic pump 22 is started and after pressure of the supply line 26 on the discharge side enters a normal state, may be obtained.

As described above, in a case where data related to active power or reactive power of the pump at the time after elapse of a predetermined time starting the hydraulic pump 22 for producing pressurized oil to be supplied to the hydraulic cylinder 16 (pitch actuator) (e.g. peak value or steady-state value), or a period from start of the hydraulic pump 22 to the time when pressure in the supply line 26 on the discharge side of the hydraulic pump 22 reaches a predetermined value PA is obtained as data for health check of the hydraulic pump 22, it is possible to diagnose the hydraulic pump 22 appropriately by using the data for health check.

In some embodiments, data for health check of the blade pitch mechanism 20 is obtained during a shutdown or a standby of the wind turbine power generating apparatus 1, under a condition that wind velocity of wind toward the wind turbine power generating apparatus 1 is not higher than a predetermined value and rotation speed of the rotational shaft 6 (main shaft rotation speed) is not higher than a predetermined value. Further, by comparing with a predetermined normal management value or a normal management range corresponding to the data for health check, it is determined whether the blade pitch mechanism 20 in need of checking. That is, by comparing the data for heath check as describe above to a threshold, or on the basis of whether the data for health check is within a predetermined range, the blade pitch mechanism 20 is diagnosed.

As described above, by obtaining data for health check of the blade pitch mechanism 20 during a shutdown or a standby of the wind turbine power generating apparatus 1 under a condition that wind velocity and main shaft rotation speed are not higher than a predetermined value, the data for health check is obtained in a state where influence of wind load or the like applied to the wind turbine blades 4 is reduced, and thereby it is possible to diagnose the wind turbine power generating apparatus 1 accurately.

In an embodiment, the data for health check of the blade pitch mechanism 20 may be obtained under a condition that wind velocity is not higher than 12 m/s, or 10 m/s.

Further, in an embodiment, the data for health check of the blade pitch mechanism 20 may be obtained under a condition that the main shaft rotation speed is not higher than 1.3 rpm or 1.1 rpm.

By obtaining data for health check of the blade pitch mechanism 20 under the above condition, the data for health check is obtained in a state where influence of wind load or the like applied to the wind turbine blades 4 is reduced adequately, and thereby it is possible to diagnose the wind turbine power generating apparatus 1 accurately.

In some embodiments, in the above diagnosis method, the change amount of the azimuth angle of the wind turbine rotor 2 may be not greater than 180 degrees, while a response value corresponding to operation of the hydraulic cylinder 16 (pitch actuator) is measured for each wind turbine blade 4.

In this case, the change amount of the azimuth angle of the wind turbine rotor 2 is small while measuring the response value for each of the plurality of wind turbine blades 4, and thus it is possible to obtain the response value in a state where influence such as fluctuation of load to the wind turbine blade 4 due to change in the azimuth angle of the wind turbine rotor 2 is reduced. Accordingly, it is possible to perform precise diagnosis on the wind turbine power generating apparatus 1.

The diagnosis method according to some embodiments includes measuring pressure of oil in the supply line 26 (common oil line) and gas pressure of the accumulator 41 disposed in the supply line 26 (common oil line; see FIG. 1) disposed so as to be shared by the hydraulic cylinders 16 of the respective wind turbine blades 4, in a state where pressurized oil is discharged from the supply line 26 (common oil line). Furthermore, the method may include obtaining, as data for health check of the accumulator 41, at least one of the discharge time of oil from the accumulator 41 until a difference between the gas pressure of the accumulator 41 and the oil pressure of the supply line 26 reaches a set value or higher, or the gas pressure of the accumulator 41 at the time when oil pressure of the supply line 26 decreases to a predetermined value.

Alternatively, the diagnosis method according to some embodiments includes measuring the oil pressure of the oil line and the gas pressure of the accumulator disposed in the oil line, in a state where pressurized oil is discharged from another oil line (not shown; e.g. yaw brake line for supplying pressurized oil to a yaw brake device) connected to the supply line 26 (common oil line; see FIG. 1). Furthermore, the method may include obtaining, as data for health check of the accumulator, at least one of the discharge time of oil from the accumulator until a difference between the gas pressure of the accumulator and the oil pressure of the oil line reaches a set value or higher, or the gas pressure of the accumulator at the time when oil pressure of the oil line decreases to a predetermined value.

For instance, in some cases, as in the embodiment shown in FIGS. 2 and 3, in a state where pressurized oil is discharged from the supply line 26 or another oil line connected to the supply line 26, pressurized oil from the supply line 26 is not supplied to the branch supply line 27 of the pitch drive device 14 disposed corresponding to each wind turbine blade 4. In this case, also during acquisition of data for health check on the side of the pitch drive device 14 corresponding to each wind turbine blade 4, it is possible to obtain data for health check of the accumulator disposed in the supply line 26, or an accumulator disposed in another oil line.

In some embodiments, the emergency operation pitch rate upon operation of the hydraulic cylinder 167 (pitch actuator) to the feather side with pressurized oil supplied by operation of the emergency valve 58 from the plurality of pitch accumulators 66 provided corresponding to the plurality of wind turbine blades 4 may be obtained as data for health check of the emergency valve 58 or the pitch accumulator 66.

For instance, as shown in FIG. 7, when time $\Delta t$ elapses before the pitch angle changes to the feather side by a predetermined angle $\Delta\theta$ from the pitch angle A7 of the wind turbine blade 4 at time t20 (see FIG. 7) when the emergency valve 58 is operated, the emergency operation pitch rate can be expressed by $\Delta\theta/\Delta t$.

By obtaining the emergency operation pitch rate as data for health check, it is possible to diagnose the emergency valve 58 or the pitch accumulator 66 appropriately.

As described above, the diagnosis system 100 of the wind turbine power generating apparatus 1 according to some embodiments is configured to store the above described data for health check in the memory of the wind turbine controller 110.

The wind turbine controller 110 is capable of obtaining a measurement value from a sensor in every control calculation cycle of the wind turbine controller 110 and holding the same. In the above described embodiment, from data obtained in each control calculation cycle by the wind turbine controller 110, a response value suitable as data for health check is stored in the memory. The data for health check stored in the memory as described above is obtained from fine data per control calculation cycle, precisely representing the state of the wind turbine power generating apparatus 1. Thus, it is possible to perform appropriate diagnosis on the wind turbine power generating apparatus 1 by using the data for health check stored in the memory.

In some embodiments, the diagnosis system 100 may include a data collection device (not shown) for collecting data for health check of the blade pitch mechanism 40 from a memory of the wind turbine controller 110.

In this case, the data collection part collects the data for health check from the memory, and thus it is possible to reduce communication load and easily perform subsequent data analysis, as compared to a case in which data is directly taken out from the wind turbine controller 110 in each control calculation cycle.

Furthermore, a common data collection device may be provided for a plurality of wind turbine power generating apparatuses 1. For instance, one data collection device may be provided for a wind farm including the plurality of wind turbine power generating apparatuses 1, and the data collection device may collect data for health check from the memory of each wind turbine controller 110 of the plurality of wind turbine power generating apparatuses 1 belonging to the wind farm.

In some embodiments, the diagnosis system 100 may include a diagnosis device configured to perform health check of the blade pitch mechanism 40 on the basis of data for health check collected by the above described data collection device.

In this case, it is possible to perform health check of the blade pitch mechanism 40 appropriately with the diagnosis device on the basis of data for health check collected by the above described data collection device.

In some embodiments, the diagnosis system 100 of the wind turbine power generating apparatus 1 includes a representative data selection part for selecting representative data, and a representative data memory part for storing the representative data, from data of at least one parameter indicating a state of the wind turbine power generating apparatus obtained by a sensor.

The representative data selection part is configured to obtain data related to the at least one parameter once in every cycle of not longer than 100 ms, and determine whether to store the obtained data as the representative data of the parameter in the representative data memory part for every cycle. Further, the representative data selection part is configured to select the above described data for health check as the representative data.

The above diagnosis system 100 is configured to obtain the data of the parameter indicating the state of the wind turbine power generating apparatus in a relatively short cycle of not longer than 100 ms, and determine whether to store the data as the representative data. Furthermore, the representative data memory part stores the data determined as necessary to be stored as the representative data by the representative data selection part. The data for health check stored in the representative data memory part as described above is obtained from fine data per relatively-short cycle, and thus precisely represent the state of the wind turbine power generating apparatus 1. Therefore, by using the data for health check, it is possible to diagnose the wind turbine power generating apparatus 1 appropriately.

The wind turbine controller 110 may have the function of the representative data selection part, or an analysis device other than the wind turbine controller 110 may have the function of the representative data selection part.

Furthermore, the representative data memory part may be the memory of the wind turbine controller 110, of the memory of the above described analysis device or the like.

In some embodiments, the above diagnosis system 100 may include a data collection part configured to collect, from the representative data memory part, the data for health check which is the representative data of the at least one parameter related to the state of the wind turbine power generating apparatus 1 stored in the representative data memory part.

As described above, the data collection part collects the representative data from the representative data memory part, and thus it is possible to reduce communication load and easily perform subsequent data analysis, as compared to a case in which data is directly taken out from the representative data memory part in a relatively short cycle.

Thus, by using the representative data collected as described above, it is possible to diagnose the wind turbine power generating apparatus 1 appropriately through facilitated data analysis.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A method of diagnosing a wind turbine power generating apparatus, comprising:
    an operation step of operating a pitch actuator corresponding to one of a plurality of wind turbine blades of the wind turbine power generating apparatus, without operating a pitch actuator corresponding to each of the wind turbine blades other than the one of the plurality of wind turbine blades; and
    a measurement step of measuring response values indicating a response to operation of the pitch actuator corresponding to the one of the plurality of wind turbine blades,
    wherein the operation step and the measurement step are performed repeatedly for each of the plurality of wind turbine blades, and the response values are obtained as data for health check of a blade pitch mechanism of the wind turbine power generating apparatus, wherein
    the pitch actuator of said one of the plurality of wind turbine blades is driven to change a pitch angle of said one of the plurality of wind turbines to a first target value under a constant current condition where a driving current for driving the pitch actuator is maintained to be constant, and
    the data for the health check includes at least a first period of time required for the pitch angle to reach the first target value under the constant current condition.

2. The method of diagnosing a wind turbine power generating apparatus according to claim 1, wherein the driving current is a servo current to be supplied to a servo proportional valve for supplying pressurized oil to a hydraulic cylinder serving as the pitch actuator.

3. The method of diagnosing a wind turbine power generating apparatus according to claim 1, comprising:
a step of, after operating the pitch actuator corresponding to one of a plurality of pitch accumulators corresponding to the plurality of wind turbine blades to a feather side with pressurized oil supplied from the one of the pitch accumulators, measuring a pressure of oil in a pitch oil line including the one of the pitch accumulators disposed therein and a gas pressure of the one of the pitch accumulators, during a period in which the pitch actuator is operated toward a fine side or the feather side only with the pressurized oil supplied from the one of the pitch accumulators; and
a step of obtaining the gas pressure at a point of time when a difference between the gas pressure and a pressure of the oil reaches a set value or a later appropriate point of time when the difference is not smaller than the set value, as the data for health check of the blade pitch mechanism.

4. The method of diagnosing a wind turbine power generating apparatus according to claim 3, comprising:
a step of obtaining an index indicating a temperature of gas of the pitch accumulator at a point of time when a difference between the gas pressure and a pressure of the oil reaches a set value or a later appropriate point of time when the difference is not smaller than the set value;
a step of obtaining the gas pressure at the point of time and the index indicating the temperature at the point of time, as data for health check of the pitch accumulator; and
a step of diagnosing the one of the pitch accumulators on the basis of a correlation between the gas pressure at the point of time and the index indicating the temperature at the point of time.

5. The method of diagnosing a wind turbine power generating apparatus according to claim 1, comprising:
a step of obtaining, as data for health check of emergency operation of the blade pitch mechanism, a second period of time required to change a pitch angle of the wind turbine blade to a second target value by operating the pitch actuator to a feather side with pressurized oil supplied by opening operation of an emergency valve from a plurality of pitch accumulators provided corresponding to the plurality of wind turbine blades, respectively.

6. The method of diagnosing a wind turbine power generating apparatus according to claim 1, comprising:
a step of obtaining, as data for health check of an accumulator solenoid valve, a third period of time required to change a pitch angle of the wind turbine blade to a third target value by operating the pitch actuator to a fine side or a feather side with pressurized oil supplied via the accumulator solenoid valve from a plurality of pitch accumulators provided corresponding to the plurality of wind turbine blades, respectively.

7. The method of diagnosing a wind turbine power generating apparatus according to claim 1,
wherein the wind turbine power generating apparatus comprises:
an oil supply line for supplying pressurized oil to a hydraulic cylinder serving as the pitch actuator; and
a proportional valve disposed in the oil supply line, for adjusting the pressurized oil supplied to the hydraulic cylinder,
wherein the method comprises a step of obtaining, as data for health check of the proportional valve, a pressure of the oil supply line at a start and an end of a predetermined period of time in a state where supply of the pressurized oil to the oil supply line and discharge of the pressurized oil from the oil supply line are stopped.

8. The method of diagnosing a wind turbine power generating apparatus according to claim 1, further comprising:
a step of obtaining, as data for health check of a pump, data related to active power or reactive power of the pump for producing pressurized oil to be supplied to the pitch actuator after elapse of a predetermined period of time after starting the pump or time from when the pump is started to when a line pressure of a discharge side of the pump reaches a predetermined value.

9. The method of diagnosing a wind turbine power generating apparatus according to claim 1,
wherein the data for health check of the blade pitch mechanism is obtained during shutdown or standby of the wind turbine power generating apparatus under a condition such that a wind velocity to the wind turbine power generating apparatus is not greater than a predetermined value and a main shaft rotation speed is not greater than a predetermined value, and
wherein the data for health check is compared to a predetermined normal management value or a predetermined normal management range corresponding to the data for health check, to determine whether the blade pitch mechanism is in need of checking.

10. A method of diagnosing a wind turbine power generating apparatus, comprising:
an operation step of operating a pitch actuator corresponding to one of a plurality of wind turbine blades of the wind turbine power generating apparatus, without operating a pitch actuator corresponding to each of the wind turbine blades other than the one of the plurality of wind turbine blades; and
a measurement step of measuring response values indicating a response to operation of the pitch actuator corresponding to the one of the plurality of wind turbine blades,
wherein
the operation step and the measurement step are performed repeatedly for each of the plurality of wind turbine blades,
the response values are obtained as data for health check of a blade pitch mechanism of the wind turbine power generating apparatus,
the pitch actuator of said one of the plurality of wind turbine blades is driven to change a pitch angle of said one of the plurality of wind turbines at a constant rate under a feedback-controlled current condition where a driving current for driving the pitch actuator is feedback-controlled so that the pitch angle changes at the constant rate, and
the data for the health check includes at least a time integrated value of the driving current for a period when the pitch actuator is driven under the feedback-controlled current condition.

11. A diagnosis system for a wind turbine power generating apparatus, comprising:
a wind turbine controller including a memory and configured to operate a pitch actuator corresponding to one of a plurality of wind turbine blades of the wind turbine power generating apparatus, without operating a pitch actuator corresponding to each of the wind turbine blades other than the one of the wind turbine blades; and at least one sensor for measuring response values indicating a response to operation of the pitch actuator corresponding to the one of the plurality of wind turbine blades, wherein the wind turbine controller is configured to perform operation of the pitch actuator and measurement by the sensor repeatedly for each of the plurality of wind turbine blades, and store the response values in the memory as data for health check of a blade pitch mechanism of the wind turbine power generating apparatus, wherein the wind turbine controller is further configured to:
   drive the pitch actuator of said one of the plurality of wind turbine blades to change a pitch angle of said one of the plurality of wind turbines to a first target value under a constant current condition where a driving current for driving the pitch actuator is maintained to be constant; and
   obtain the data for the health check including at least a first period of time required for the pitch angle to reach the first target value under the constant current condition.

12. A diagnosis system for a wind turbine power generating apparatus for performing the method according to claim 1, the system comprising:

a representative data memory part for storing representative data related to at least one parameter indicating a state of the wind turbine power generating apparatus; and a representative data selection part configured to obtain data related to the at least one parameter once in every cycle not longer than 100 milliseconds, and determine whether to store the obtained data of the at least one parameter as the representative data in the representative data memory part for every cycle, wherein the representative data selection part is configured to select the data for health check as the representative data.

* * * * *